US008126308B2

(12) United States Patent  
Shibata et al.

(10) Patent No.: US 8,126,308 B2  
(45) Date of Patent: Feb. 28, 2012

(54) VIDEO SIGNAL PROCESSOR, VIDEO SIGNAL RECORDER, VIDEO SIGNAL REPRODUCER, VIDEO SIGNAL PROCESSOR PROCESSING METHOD, VIDEO SIGNAL RECORDER PROCESSING METHOD, VIDEO SIGNAL REPRODUCER PROCESSING METHOD, RECORDING MEDIUM

(75) Inventors: Yoshiaki Shibata, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1362 days.

(21) Appl. No.: 10/536,530

(22) PCT Filed: Nov. 28, 2003

(86) PCT No.: PCT/JP03/15232  
§ 371 (c)(1),  
(2), (4) Date: Mar. 27, 2006

(87) PCT Pub. No.: WO2004/051999  
PCT Pub. Date: Jun. 17, 2004

(65) Prior Publication Data  
US 2007/0025693 A1    Feb. 1, 2007

(30) Foreign Application Priority Data  
Nov. 29, 2002  (JP) ............................... P2002-347630

(51) Int. Cl.  
*H04N 5/765* (2006.01)
(52) U.S. Cl. ...................................... 386/232
(58) Field of Classification Search ...... 386/95  
See application file for complete search history.

(56) References Cited

U.S. PATENT DOCUMENTS 6,775,680 B2 *  8/2004  Ehrman et al. ................ 707/102  
7,295,752 B1 *  11/2007  Jain et al. ........................ 386/46  
2001/0049691 A1  12/2001  Asazu  
(Continued)

FOREIGN PATENT DOCUMENTS

EP        1 187 476         3/2002  
(Continued)

OTHER PUBLICATIONS

MetaNet—A Metadata Term Thesaurus to Enable Semantic Interoperability Between Metadata Domains, Jane Hunter, Journal of Digital Information, Aug. 2, 2001.

*Primary Examiner* — William C Vaughn, Jr.  
*Assistant Examiner* — Daniel Tekle  
(74) *Attorney, Agent, or Firm* — Frommer Lawrence & Haug LLP; William S. Frommer; Thomas F. Presson

(57) ABSTRACT

A video signal processing apparatus capable of flexibly handling metadata having various notation formats is provided. The video signal processing apparatus has metadata notation format identification block for identifying a metadata notation format written in a predetermined language; a conversion table selection block for selecting a conversion table corresponding to the identified metadata notation format from among one or more conversion tables prepared in advance; a metadata notation format conversion block for converting the metadata notation format into a notation format compatible with the video signal processing apparatus on the basis of the selected conversion table; and a metadata application processing block for controlling the processing associated with video signals on the basis of the metadata whose notation format has been converted.

23 Claims, 19 Drawing Sheets

U.S. PATENT DOCUMENTS

2002/0159752 A1   10/2002   David

FOREIGN PATENT DOCUMENTS

| | | |
|---|---|---|
| EP | 1 213 667 | 6/2002 |
| EP | 1 349 080 | 10/2003 |
| EP | 1 361 577 | 11/2003 |
| JP | 2000-253367 | 9/2000 |
| JP | 2001-292407 | 10/2001 |
| JP | 2002-27374 | 1/2002 |
| JP | 2002-298133 | 10/2002 |
| JP | 2002-300523 | 10/2002 |
| WO | WO 01 75886 | 10/2001 |

* cited by examiner

FIG. 2

| PROGRAM IDENTIFICATION LAYER | MATERIAL GATHERING LAYER | | SCENE LAYER | | | CUT LAYER | | | | | | |
|---|---|---|---|---|---|---|---|---|---|---|---|---|
| | MATERIAL GATHERING INSTRUCTION | MATERIAL GATHERING MEMO | SCENE INSTRUCTION | SCENE MEMO | CUT INSTRUCTION | CUT MEMO | TAKE-RELATING INFORMATION | | | | | |
| | | | | | | | TAKE DATA | OK/NG | VIDEO FILE NAME | LOW-RESOLUTION FILE NAME | METADATA FILE NAME |
| [ID] P2002-10 [Ttl] NOODLE SOUP BOUNDARY BETWEEN THE EAST AND WEST JAPAN | [ID] A2002-1001 [Ttl] NOODLE SOUP OF NAGOYA [Cam] KOIZUMI [Rep] FUKUDA [Pic] A SOBA SHOP, NAGOYA [Tim] 9:00 - 10:00 [Dsc] INTRODUCES THAT NAGAYA'S NOODLE SOUP IS BASED ON STOCK. | [Dsc] NAGOYA ALSO HAS MANY SHOPS USING AKAMISO-BASED SOUP. SO, IT WOULD BE BETTER TO INTRODUCE THEM LATER. | [No] 1 [Ttl] EXTERNAL VIEW OF SHOP | [Dsc] NAGOYA CASTLE IS SCENE BEHIND THE SHOP LOCATED ON SHOPPING STREET. | [No] 1 [Ttl] WHOLE SHOP | [Dsc] 2 TAKES MADE | [No]1 [IN]xx:xx:xx:xx [OUT]xx:xx:xx:xx | OK | VIDEO-1 .mxf | LORES-1 .mpg | TAKE-METADATA-1.xml |
| | | | | | | | [No]2 | NG | VIDEO-2 .mxf | LORES-2 .mpg | TAKE-METADATA-2.xml |
| | | | | | [No] 2 [Ttl] ENTRANCE OF SHOP | | [No]3 [IN]xx:xx:xx:xx [OUT]xx:xx:xx:xx | OK | VIDEO-3 .mxf | LORES-3 .mpg | TAKE-METADATA-3.xml |
| | | | [No] 2 [Ttl] INSIDE SHOP [Dsc] SHOW THAT NOODLE SOUP COLOR IS THIN IN NAGOYA. | | [No] 1 [Ttl] ASK OWNER FOR COLOR OF NOODLE SOUP | [Dsc] OWNER'S FACIAL EXPRESSION IS ATTRACTIVE | [No]4 [IN]xx:xx:xx:xx [OUT]xx:xx:xx:xx | OK | VIDEO-4 .mxf | LORES-4 .mpg | TAKE-METADATA-4.xml |
| | | | | | [No] 2 [Ttl] COLOR OF SOUP IS THIN | | [No]5 [IN]xx:xx:xx:xx [OUT]xx:xx:xx:xx | OK | VIDEO-5 .mxf | LORES-5 .mpg | TAKE-METADATA-5.xml |
| | | | | | [No] 3 [Ttl] REPORTER EATS NOODLE | | [No]6 [IN]xx:xx:xx:xx [OUT]xx:xx:xx:xx | OK | VIDEO-6 .mxf | LORES-6 .mpg | TAKE-METADATA-6.xml |
| | [ID] A2002-1002 [Ttl] SOUP OF MIKAWA-ANJO [Cam] KOIZUMI [Rep] FUKUDA [Pic] A SOBA SHOP, MIKAWA-ANJO [Dsc] CONCLUDES THAT MIKAWA-ANJO IS THE BOUNDARY OF NOODLE SOUP COLOR. | [Dsc] IN MIKAWA-ANJO, NOODLE SOUP COLORS SOMETIMES DIFFER FROM SHOP TO SHOP THAT ARE AS CLOSE AS 100 METERS. | [No] 1 [Ttl] EXTERNAL VIEW OF SHOP | [Dsc] OLD CITYSCAPE IS IMPRESSIVE | [No] 1 [Ttl] WHOLE SHOP | | [No]7 | NG | VIDEO-7 .mxf | LORES-7 .mpg | TAKE-METADATA-7.xml |
| | | | | | [No] 2 [Ttl] ENTRANCE OF SHOP | | [No]8 [IN]xx:xx:xx:xx [OUT]xx:xx:xx:xx | OK | VIDEO-8 .mxf | LORES-8 .mpg | TAKE-METADATA-8.xml |
| | | | [No] 2 [Ttl] INSIDE SHOP [Dsc] OWNER DESCRIBES THAT THERE ARE NOODLE SOUPS OF VARIOUS THICKNESSES IN THE AREA AND REPORTER ANNOUNCES THAT HE/SHE WILL PROVE IT. | | [No] 1 [Ttl] ASK OWNER FOR COLOR OF NOODLE SOUP | | [No]9 [IN]xx:xx:xx:xx [OUT]xx:xx:xx:xx | OK | VIDEO-9 .mxf | LORES-9 .mpg | TAKE-METADATA-9.xml |
| | | | | | [No] 2 [Ttl] COLOR OF NOODLE SOUP IS INTERMEDIATE | | [No]10 [IN]xx:xx:xx:xx [OUT]xx:xx:xx:xx | OK | VIDEO-10 .mxf | LORES-10 .mpg | TAKE-METADATA-10.xml |
| | | | | | [No] 3 [Ttl] TESTIMONY BY OWNER | | [No]11 [IN]xx:xx:xx:xx [OUT]xx:xx:xx:xx | OK | VIDEO-11 .mxf | LORES-11 .mpg | TAKE-METADATA-11.xml |
| | | | [No] 3 [Ttl] OUTSIDE SHOP [Dsc] MAKE COMPARISON BETWEEN SOME SOBA SHOPS IN THE AREA AND ANNOUNCE THAT MIKAWA-ANJO FORMS THE BOUNDARY. | | [No] 1 [Ttl] DELIVERY SERVICE PERSONNEL OF EACH SHOP | | [No]12 [IN]xx:xx:xx:xx [OUT]xx:xx:xx:xx | OK | VIDEO-12 .mxf | LORES-12 .mpg | TAKE-METADATA-12.xml |
| | | | | | [No] 2 [Ttl] COMPARE COLORS OF NOODLE SOUPS | [Dsc] THERE IS DISTINCTIVE DIFFERENCE BETWEEN COLORS | [No]13 [IN]xx:xx:xx:xx [OUT]xx:xx:xx:xx | OK | VIDEO-13 .mxf | LORES-13 .mpg | TAKE-METADATA-13.xml |
| | | | | | [No] 3 [Ttl] DECLARATION OF BOUNDARY | | [No]14 [IN]xx:xx:xx:xx [OUT]xx:xx:xx:xx | OK | VIDEO-14 .mxf | LORES-14 .mpg | TAKE-METADATA-14.xml |
| | | | | | | | [No]15 [IN]xx:xx:xx:xx [OUT]xx:xx:xx:xx | OK | VIDEO-15 .mxf | LORES-15 .mpg | TAKE-METADATA-15.xml |

FIG. 3

A { `<?xml version="1.0" encoding="Shift_JIS"?>`
B { `<ProgramMetadata id="P2002-10"title="BOUNDARY OF NOODLE SOUP COLOR BETWEEN EAST AND WEST JAPAN ">`
  C { `<Acquisition>`

D {
```
<Assignment id="A2002-1001"title="NOODLE SOUP OF NAGOYA">
    <Cameraman>KOIZUMI</Cameraman>
    <Reporter>FUKUDA</Reporter>
    <Time begin="9:00"end="10:00"/>
    <Place>A SOBA SHOP, NAGOYA</Place>
    <Description>INTRODUCES THAT NAGOYA' S NOODLE SOUP IS BASED ON STOCK</Description>
</Assignment>
```

E { `<FieldNote>NAGOYA ALSO HAS MANY SHOPS USING AKAMISO-BASED SOUP.`
      `SO, IT WOULD BE BETTER TO INTRODUCE THEM LATER</FieldNote>`

F {
```
<Scene no="1" title="EXTERNAL VIEW OF SHOP">
```

G {
```
    <Cut no="1" title="WHOLE SHOP">
      <Take no="1" inPoint="xx:xx:xx:xx"outPoint="xx:xx:xx:xx"status="OK">
        <Material href="file://VIDEO-1.mxf"/>
        <Proxy href="file://LORES-1.mpg"/>
        <Metadata href="file://TAKE-METADATA-1.xml"/>
      </Take>
      <Take no="2" status="NG">
        <Material href="file://VIDEO-2.mxf"/>
        <Proxy href="file://LORES-2.mpg"/>
        <Metadata href="file://TAKE-METADATA-2.xml"/>
      </Take>
    </Cut>
```

H {
```
    <CutNote>2 TAKES MADE</CutNote>
    <Cut no="2" title="ENTRANCE OF SHOP">
      <Take no="3" inPoint="xx:xx:xx:xx"outPoint="xx:xx:xx:xx">
        <Material href="file://VIDEO-3.mxf"/>
        <Proxy href="file://LORES-3.mpg"/>
        <Metadata href="file://TAKE-METADATA-3.xml"/>
      </Take>
    </Cut>
```

```
  </Scene>
```
I { `<SceneNote>NAGOYA CASTLE IS SCENE BEHIND THE SHOP LOCATED ON SHOPPING STREET</SceneNote>`

FIG. 4

```
⎡ <Scene no="2" title="INSIDE SHOP">
⎢       <Description>SHOW THAT NOODLE SOUP COLOR IS THIN IN NAGOYA</Description>
⎢       <Cut no="1" title="ASK OWNER FOR COLOR OF NOODLE SOUP">
⎢           <Take no="4" inPoint="xx:xx:xx:xx"outPoint="xx:xx:xx:xx">
⎢               <Material href="file://VIDEO-4.mxf"/>
⎢               <Proxy href="file://LORES-4.mpg"/>
⎢               <Metadata href="file://TAKE-METADATA-4.xml"/>
⎢           </Take>
⎢       </Cut>
⎢       <CutNote>OWNER'S FACIAL EXPRESSION IS ATTRACTIVE</CutNote>
⎢       <Cut no="2" title="COLOR OF NOODLE SOUP IS THIN">
⎢           <Take no="5" inPoint="xx:xx:xx:xx"outPoint="xx:xx:xx:xx">
J ⎨               <Material href="file://VIDEO-5.mxf"/>
⎢               <Proxy href="file://LORES-5.mpg"/>
⎢               <Metadata href="file://TAKE-METADATA-5.xml"/>
⎢           </Take>
⎢       </Cut>
⎢       <Cut no="3" title="REPORTER EATS NOODLE">
⎢           <Take no="6" inPoint="xx:xx:xx:xx"outPoint="xx:xx:xx:xx">
⎢               <Material href="file://VIDEO-6.mxf"/>
⎢               <Proxy href="file://LORES-6.mpg"/>
⎢               <Metadata href="file://TAKE-METADATA-6.xml"/>
⎢           </Take>
⎢       </Cut>
⎣   </Scene>
        <!-- OMITTED BELOW -->
C' { </Acquisition>
B' { </ProgramMetadata>
```

FIG. 5

| FILE NAME | TAKE METADATA |
|---|---|
| TAKE METADATA 1 .xml | [Dsc] HEAVY CAR TRAFFIC<br>[Date] 2002/4/15<br>[Time] 12:35:14<br>[Pos] N35° 40'23", E135° 35' 50"<br>[Machine] XXX-100(123456)<br>[Setup]<br>filter; 1-2<br>white switch; A<br>gain; 0<br>dcc; off<br>shutter; off<br>extender; off |

FIG. 6

```
A {  <? xml version="1.0" encoding="iso-8859-1" ? >
B {  <TakeMetadata no="1">
C {    <Description>HEAVY CAR TRAFFIC</Description>
       <CreationDate is SummarTime="false">2002-04-15</CreationDate>
D {    <CreationTime is SummarTime="false">12:35:14+09:00</CreationTime>
       <Position>N35° 40' 23", E135° 35' 50"</Position>
       <Device>
E {      <Machine name="XXX-100" serialNo="12345678"/>
         <CameraSetting filter="1-2" whiteswitch="A" gain="0" dcc="off" shutter="off" extender="off"/>
       </Device>
B'{  </TakeMetadata>
```

F I G . 7
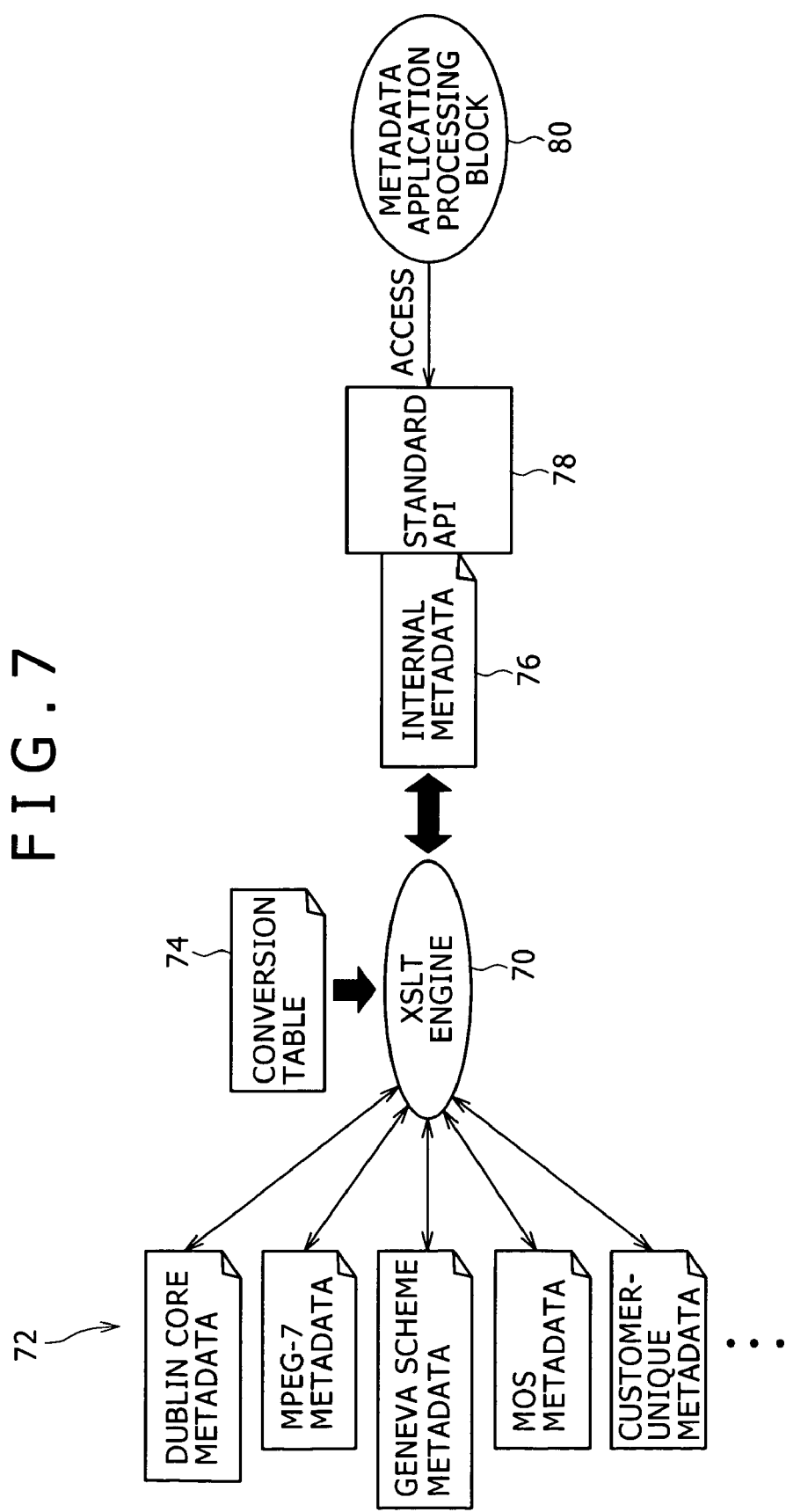

FIG. 9

```
A { <mos>
B { <mosID>fieldMos.newscenter.com</mosID>
    <ncsID>ncs.newscenter.com</ncsID>
C { <afObj>
D { <afID>96857485</afID>
    <afSlug>Hotel Fire</afSlug>
E { <photographer>John</photographer>
    <reporter>Michel</reporter>
    <description>Hotel fire at the corner of 5th street. Take from front of the hotel.</description>
C'{ </afObj>
A'{ </mos>
```

FIG.10

| MOS METADATA | INTERNAL METADATA |
|---|---|
| afObj | Aquisition |
| afID | Assignment@id |
| afSlug | Assignment@title |
| photographer | Cameraman |
| reporter | Reporter |
| description | Description |

FIG. 11

```
a { <ProgramMetadata>
b {  <mos:mosID>fieldMos.newscenter.com</mos:mosID>
     <mos:ncsID>ncs.newscenter.com</mos:ncsID>
c {  <Acquisition>
d {    <Assignment id="96857485" title="Hotel Fire">
e {      <Cameraman>John</Cameraman>
         <Reporter>Michel</Reporter>
         <Description>Hotel fire at the corner of 5th street. Take from front of the hotel</Description>
d' {   </Assignment>
c' {  </Acquisition>
a' { </ProgramMetadata>
```

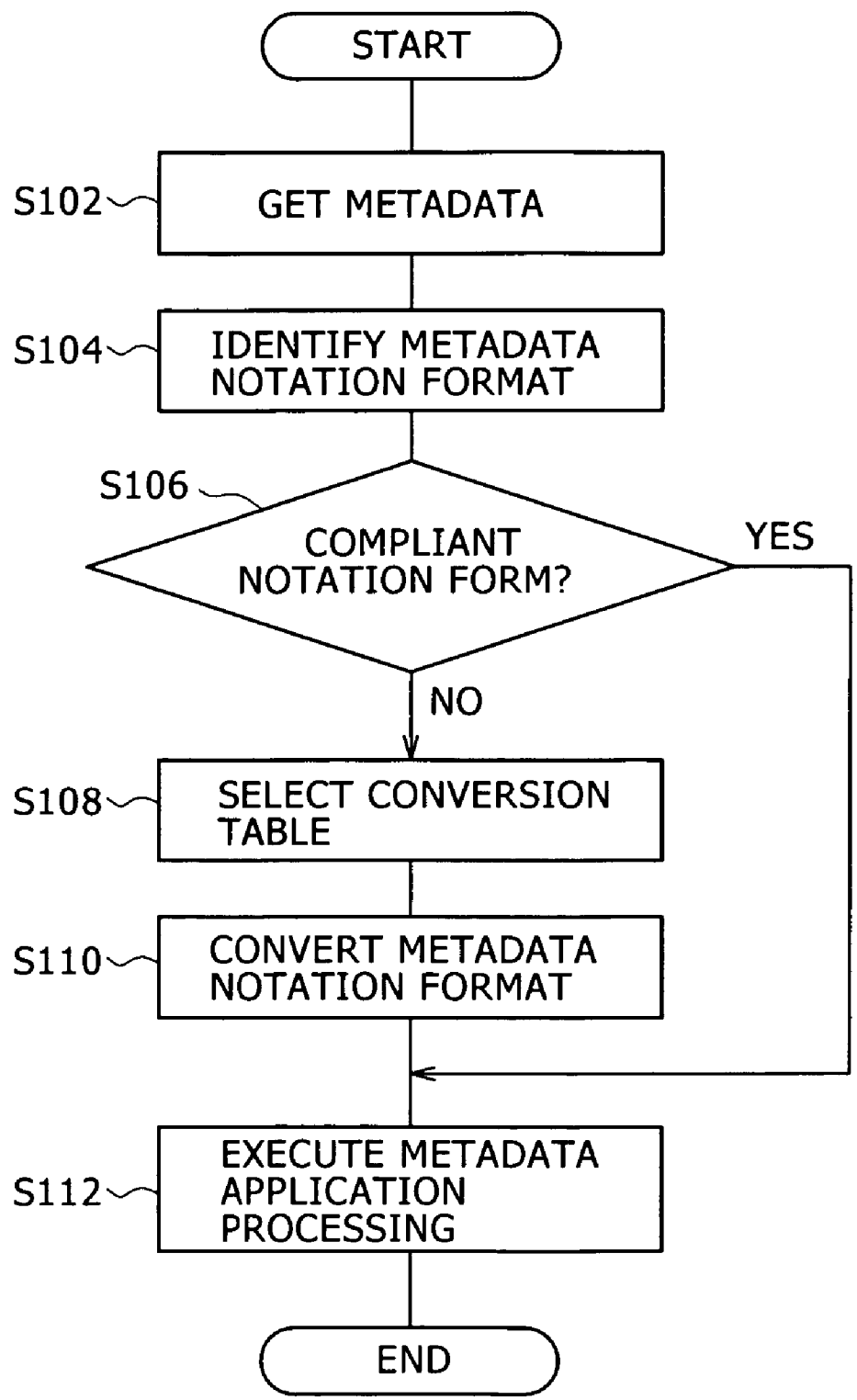

VIDEO SIGNAL PROCESSOR, VIDEO SIGNAL RECORDER, VIDEO SIGNAL REPRODUCER, VIDEO SIGNAL PROCESSOR PROCESSING METHOD, VIDEO SIGNAL RECORDER PROCESSING METHOD, VIDEO SIGNAL REPRODUCER PROCESSING METHOD, RECORDING MEDIUM

TECHNICAL FIELD

The present invention relates generally to a video signal processing apparatus, a video signal recording apparatus, a video signal reproduction apparatus, and processing methods and a recording medium therefor.

BACKGROUND ART

Recently, the use of metadata associated with taken video materials (such as video data) has been becoming popular in the field of the production of video works such as TV programs and video content. The effective use of such metadata requires the compatibility in metadata between a plurality of equipment units for use in the production of video works. For example, situations where the metadata generated by a video signal recording apparatus such as a video camera is used by a video signal reproduction apparatus such as editing equipment require the compatibility of the metadata to be shared therebetween.

Conventionally, however, the notation forms and semantics of the above-mentioned metadata lack integrity and therefore there is no compatibility at all between the notation forms and semantics even in the same uses of the metadata. In such a situation, the standardization of metadata notation forms has been pursued. As a result, the description of metadata in XML (extensible Markup Language) or the like that is high in universality has come to use, attempting the standardization. However, currently, this standardization attempt is not completely successful because there still remain variations in metadata notation format owing to the different concepts and purposes of standardization organizations.

On the other hand, because each user ultimately uses metadata for the purpose of satisfying the individual demands, the diversification of metadata formats is unavoidable to some extent. In other words, it would be unlikely for a certain single metadata format to be widely used in all video work production fields, now and in the future. Even if this would become a reality, the demands for addition and extension of metadata formats due to individual users' needs still remain.

In order to cope with highly various metadata formats, a conversion tool and a conversion table compatible with each metadata format must be developed. Even if such a conversion tool is of an independent, general-purpose one, the conversion table has no other choice but be unique to each metadata notation format, so that the conversion table such as above must be prepared every time the conversion between metadata formats takes place.

Consequently, the related-art technologies present a problem of the inability of each equipment unit for use in the production of video works to flexibly cope with various metadata notation formats. This problem makes it difficult to promptly and smoothly pass metadata between a plurality of these equipment units.

It is therefore an object of the present invention to provide a novel and improved video signal processing apparatus and processing method therefor that are capable of flexibly coping with various metadata notation formats.

DISCLOSURE OF INVENTION

It is therefore an object of the present invention to provide a novel and improved video signal processing apparatus and processing method therefor that are capable of flexibly coping with various metadata notation formats.

In carrying out the invention and according to a first aspect thereof, there is provided a video signal processing apparatus for processing video signals. This video signal processing apparatus has a metadata notation format identification block for identifying a notation format of metadata written in a predetermined language; a conversion table selection block for selecting a conversion table corresponding to the identified notation format of the metadata from among one or more conversion tables prepared in advance; a metadata notation format conversion block for converting the notation format of the metadata into a notation format compatible with the video signal processing apparatus on the basis of the selected conversion table; and a processing control block for controlling processing associated with the video signal on the basis of the metadata whose notation format has been converted.

The above-mentioned novel configuration allows the video signal processing apparatus to flexibly handle the metadata having a given notation format written in a predetermined language. Namely, the metadata notation format identification block is capable of identifying the notation format of externally acquired metadata. The conversion table selection block is capable of selecting a conversion table specifying rules of conversion between the notation format identified by the metadata notation format identification block and the notation format recognizable inside the video signal processing apparatus. Further, the metadata notation format conversion block is capable of converting the notation format of the acquired metadata into the notation format recognizable inside the video signal processing apparatus in accordance with the conversion rules specified in the conversion table selected by the conversion table selection block. The processing control block is capable of recognizing and processing the metadata whose notation format has been converted by the metadata notation format conversion block, thereby executing various processing operations in the video signal processing apparatus using that metadata.

It should be noted that the notation format (or schema) of metadata includes metadata form, data type, structure, document definition, attribute representation type, and other metadata types.

The above-mentioned metadata notation format identification block may be configured to identify a metadata notation format by detecting a tag from metadata written in a markup language. This configuration allows the metadata notation format identification block to easily and quickly identify a metadata notation format simply by detecting a start tag for example from metadata written in a markup language that is a tag language.

The above-mentioned video signal processing apparatus may also be configured as a video signal recording apparatus for recording video signals to a recording apparatus or a video signal reproduction processing apparatus for reproducing video signals.

In carrying out the invention and according to a second aspect thereof, there is provided a computer-readable recording medium recording a program for making a computer function as the above-mentioned video signal processing apparatus.

In carrying out the invention and according to a third aspect thereof, there is provided a processing method for a video signal processing apparatus for processing video signals. This processing method for the video signal processing apparatus includes the steps of: identifying a notation format of metadata written in a predetermined language; selecting a conversion table corresponding to the identified notation format of the metadata from among one or more conversion tables prepared in advance; converting the notation format of the metadata into a notation format compatible with the video signal processing apparatus on the basis of the selected conversion table; and controlling processing associated with the video signal on the basis of the metadata whose notation format has been converted. This novel configuration allows the video signal processing apparatus to flexibly handle the metadata having a given notation format written in a predetermined language.

In carrying out the invention and according to a fourth aspect thereof, there is provided a video signal recording apparatus for recording video signals to a recording medium. This video signal recording apparatus has a metadata generating block for generating metadata associated with the video signal by writing the metadata in a predetermined language; a metadata notation format conversion block for converting at least a notation format of the generated metadata into a notation format compatible with a video signal reproduction apparatus for reproducing the video signal recorded to the recording medium, on the basis of one or more conversion tables prepared in advance; and a video signal recording block for recording the metadata whose notation format has been converted and the video signal in a related manner so as to allow the video signal reproduction apparatus to control processing associated with the video signal on the basis of the metadata.

This novel configuration allows the video signal recording apparatus to provide the metadata generated by itself to the video signal reproduction apparatus along with video data. At this moment, the video recording apparatus is capable of executing preliminary processing of converting the notation format of the metadata generated by itself into a notation format compatible with the video signal reproduction apparatus before providing the metadata to the video signal reproduction apparatus. Consequently, the video signal reproduction apparatus becomes able to recognize and process the metadata recorded to a recording medium acquired from the video signal recording apparatus without having a special apparatus. Thus, the novel configuration makes it unnecessary for the video signal recording apparatus to forcibly apply the metadata notation format thereof to the video signal reproduction apparatus.

In carrying out the invention and according to a fifth aspect thereof, there is provided a computer-readable recording medium recording a program for making a computer function as the above-mentioned video signal recording apparatus.

In carrying out the invention and according to a sixth aspect thereof, there is provided a processing method for a video signal recording apparatus for recording video signals to a recording medium. This processing method for the video signal recording apparatus has the steps of: generating metadata associated with the video signal by writing the metadata in a predetermined language; converting at least a notation format of the generated metadata into a notation format compatible with a video signal reproduction apparatus for reproducing the video signal recorded to the recording medium, on the basis of one or more conversion tables prepared in advance; and recording the metadata whose notation format has been converted and the video data in a related manner so as to allow the video signal reproduction apparatus to control processing associated with the video signal on the basis of the metadata. This novel configuration allows the video signal recording apparatus to convert the notation format of the metadata generated by itself into a notation format compatible with the video signal reproduction apparatus before providing the metadata thereto.

In carrying out the invention and according to a seventh aspect thereof, there is provided a video signal recording apparatus for recording video signals to a recording medium. This video signal recording apparatus has a metadata generating block for generating metadata associated with the video signal by writing the metadata in a predetermined language; a conversion table selection block for selecting at least one conversion table from among one or more conversion tables prepared in advance; and a video signal recording block for recording at least the generated metadata, the selected conversion table, and the video data in a related manner to the recording medium so as to allow a video signal reproduction apparatus for reproducing the video signal recorded to the recording medium to control processing associated with the video signal on the basis of the metadata.

This novel configuration allows the video signal recording apparatus to provide the metadata generated by itself and a conversion table corresponding to this metadata to the video signal reproduction apparatus along with video data. Namely, in consideration of the video signal reproduction apparatus that uses video signals and metadata, the video signal recording apparatus that provides these video signals and metadata is capable of providing the conversion table corresponding to the metadata along with unconverted metadata so that the video data reproduction apparatus can easily convert the notation format of the metadata generated by the video signal recording apparatus and use the converted metadata. Consequently, the video signal reproduction apparatus becomes able to easily convert the notation format of the metadata recorded to a recording medium from the video signal recording apparatus and recognize and process the converted metadata. Thus, the novel configuration makes it unnecessary for the video signal recording apparatus to forcibly apply the metadata notation format thereof to the video signal reproduction apparatus.

In carrying out the invention and according to eighth aspect thereof, there is provided a computer-readable recording medium recording a program for making a computer function as the above-mentioned video signal processing apparatus.

In carrying out the invention and according to a ninth aspect thereof, there is provided a processing method for a video signal recording apparatus for recording video signals to a recording medium. This processing method for the video signal processing apparatus has the steps of: generating metadata associated with the video signal by writing the metadata in a predetermined language; selecting at least one conversion table from among one or more conversion tables prepared in advance; and recording at least the generated metadata, the selected conversion table, and the video signal in a related manner so as to allow a video signal reproduction apparatus for reproducing the video signal recorded to the recording medium to control processing associated with the video signal on the basis of the metadata. This novel configuration allows the video signal recording apparatus to provide the metadata generated by itself and a conversion table necessary for converting the notation format of the metadata to the video signal reproduction apparatus along with video data via the recording medium.

In carrying out the invention and according to a tenth aspect thereof, there is provided a video signal reproduction apparatus for reproducing video signals recorded to a recording medium. This video signal reproduction apparatus has a metadata reading block for reading metadata written in a predetermined language and at least one conversion table corresponding to a notation format of the metadata from the recording medium in which the video signal is recorded; a metadata notation format conversion block for converting the notation format of the metadata read from the recording medium into a notation format compatible with the video signal reproduction apparatus on the basis of the at least one read conversion table; and a processing control block for controlling processing associated with the video signal on the basis of the metadata whose notation format has been converted.

This novel configuration allows the video signal reproduction apparatus to easily convert the notation format of the metadata acquired from the video signal recording apparatus into a notation format compatible with itself by use of a conversion table read from the recording medium. Consequently, the processing control block of the video signal reproduction apparatus is capable of executing various processing operations in the video signal reproduction apparatus by recognizing and processing the metadata whose notation format has been converted by the metadata notation format conversion block.

In carrying out the invention and according to an eleventh aspect thereof, there is provided a computer-readable recording medium recording a program for making a computer function as the above-mentioned video signal reproduction apparatus.

In carrying out the invention and according to a twelfth aspect thereof, there is provided a processing method for a video signal reproduction apparatus for reproducing video signals recorded to a recording medium. This processing method for the video signal reproduction apparatus has the steps of: reading metadata written in a predetermined language and at least one conversion table corresponding to a notation format of the metadata from the recording medium in which the video signal is recorded; converting the notation format of the metadata read from the recording medium into a notation format compatible with the video signal reproduction apparatus on the basis of the at least one read conversion table; and controlling processing associated with the video signal on the basis of the metadata whose notation format has been converted. This novel configuration allows the video signal reproduction apparatus to easily convert the notation format of metadata acquired from the video signal recording apparatus into a notation format compatible with itself by use of a conversion table read from the recording medium.

BRIEF DESCRIPTION OF DRAWINGS

FIG. 2 is a diagram illustrating a configuration of program metadata practiced as the first embodiment of the invention.

FIG. 3 is a diagram illustrating a part of exemplary description of the program metadata described with reference to FIG. 2 by XML.

FIG. 4 is a diagram illustrating another part of the exemplary description of the program metadata described with reference to FIG. 2 by XML.

FIG. 5 is a diagram illustrating an exemplary configuration of take metadata practiced as the first embodiment.

FIG. 6 is a diagram illustrating an exemplary description of the take metadata described with reference to FIG. 5 by XML.

FIG. 7 is a diagram schematically illustrating metadata conversion by an XSLT engine practiced as the first embodiment.

FIG. 9 is a diagram illustrating an exemplary description of material gathering instruction information by MOS metadata that is one example of external metadata.

FIG. 10 is a diagram illustrating a specific conversion table example corresponding to MOS metadata and internal metadata.

FIG. 11 is a diagram illustrating an exemplary description of the material gathering instruction information by converted internal metadata.

FIG. 12 is a flowchart indicative of a processing method for an imaging apparatus practiced as the first embodiment.

BEST MODE FOR CARRYING OUT THE INVENTION

Figure 1:
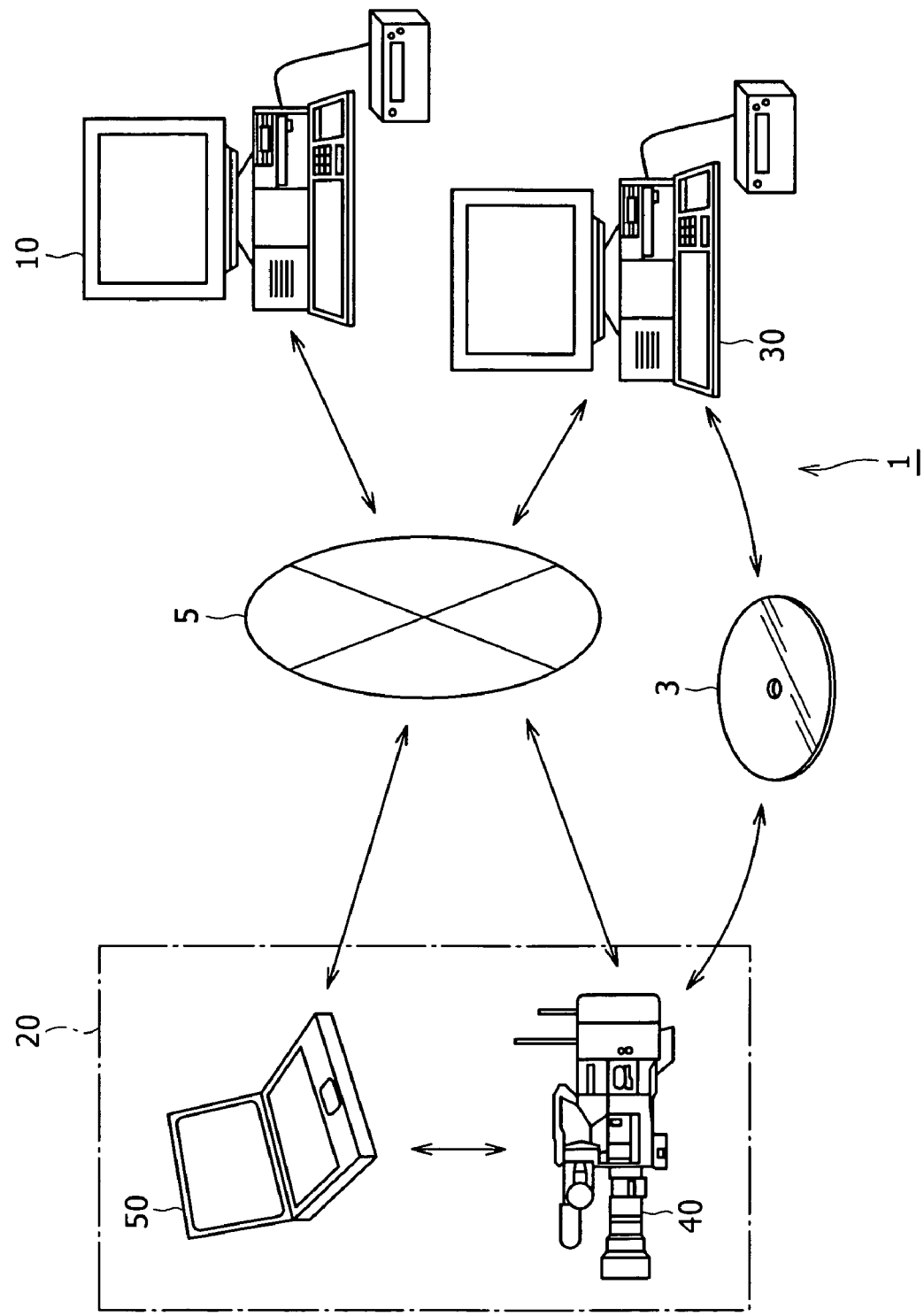
FIG. 1 is a block diagram illustrating an approximate configuration of a video program production support system practiced as a first embodiment of the invention.

This invention will be described in further detail by way of example with reference to the accompanying drawings. It should be noted that components having substantially the same functional configuration are denoted by the same reference numerals throughout the present specification and the accompanying drawings thereof to omit duplicate description for the brevity of description.

First Embodiment

The following describes a first embodiment of the invention. A video signal processing apparatus practiced as the first embodiment is capable of converting acquired metadata having a notation format incompatible with this apparatus into a notation format compatible therewith and executing processing associated with various types of video signals on the basis of the converted metadata. The following describes the video signal processing apparatus for realizing the above-mentioned feature.

1. Video Program Production Support System

First, an overall configuration of a video program production support system for which the video signal processing apparatus associated with the first embodiment is employed will be described.

The video program production support system is installed in television stations and production companies for producing video content and movies for example and supports the production of video programs that are video works such as television programs, video content, and movies for example. The characteristic of the video program production support system according to the first embodiment is that the metadata of electronic file format (details thereof will be described later) may be used in common between a plurality of terminal apparatuses used in the departments that produce video programs in a shared manner.

Now, referring to FIG. 1, a configuration of the video program production support system according to the first embodiment will be described. FIG. 1 is a block diagram illustrating an approximate configuration of the video program production support system according to the first embodiment.

As shown in FIG. 1, the video program production support system 1 is mainly configured by a network 5, a planning terminal 10, a material gathering terminal apparatus 20 made up of an imaging apparatus 40 and a field PC/PDA (hereafter referred to as a field PC) 50, and an editing terminal apparatus 30, for example.

The network 5 is an electrical communication line network for interconnecting the planning terminal apparatus 10, the imaging apparatus 40, the field PC 50, and the editing terminal apparatus 30, for example, in a bidirectionally communicable manner. In the first embodiment, the network 5 is made up of a wired communication line such as RS-422 or RS-232C and a wireless communication line such as the IEEE 802.11a standard, for example. However, the network 5 is not restricted to the above-mentioned configuration; for example, the network 5 may be made up of a fiber optics network such as FDDI (Fiber Distributed Data Interface), a communication satellite network, Ethernet (trademark), a LAN, the Internet, or any of other various dedicated or public switched line networks.

The network 5 as described above is capable of transmitting the metadata generated by the planning terminal apparatus 10 to the imaging apparatus 40 and field PC 50 (namely, the material gathering terminal apparatus 20), for example. Also, the network 5 is capable of transmitting the video data recorded by the imaging apparatus 40 and the metadata generated and edited by the imaging apparatus 40 and the field PC 50 to the editing terminal apparatus 30 for example.

It should be noted that the video program production support system 1 may not always have the network 5 such as mentioned above. If the video program production support system 1 has no network 5, then metadata and so on may be transferred between the terminal apparatuses via various recording media such as an optical disk 3, a memory card, a memory stick, and a magnetic disk, for example.

The planning terminal apparatus 10, the material gathering terminal apparatus 20, and the editing terminal apparatus 30 are used by a planning and organization department, a material gathering department, and an editing department respectively, for example.

The planning terminal apparatus 10 is based on an information processing apparatus such as a personal computer and peripheral units thereof for example and installed in the planning and organization department. The planning and organization department controls the entire production of each video program, executing the planning and conceptualization of each program to be produced to create scenarios and transmits the information about the production work to other departments such as the material gathering department and the editing department.

The planning terminal apparatus 10 has a metadata generation block (not shown) for generating metadata of an electronic file format. The metadata generation block is configured by installing the application software for generating metadata into the planning terminal apparatus 10, for example. The metadata generation block is capable of acquiring metadata content on the basis of inputs made by personnel of the planning and organization department and creating a metadata file by describing the content in a predetermined notation format (or schema) of a predetermined language such as XML for example. It should be noted that this metadata notation format may be any notation format that the planning terminal apparatus 10 is capable of handling (or recognizing), for example.

The planning terminal apparatus 10 configured as such is capable of generating program metadata (of which details will be described later) for each video program. To be more specific, the planning terminal apparatus 10 creates a framework of the above-mentioned metadata. Further, the planning terminal apparatus 10 generates production instruction information on the basis of inputs made by personnel of the planning and organization department and writes the generated information to corresponding columns in the created program metadata. The production instruction information provides instructions given by the planning and organization department to other departments for the details of the production of each video program; namely, the production instruction information is equivalent to a scenario created by the planning and organization department.

The planning terminal apparatus 10 is also capable of providing the metadata generated as described above to the material gathering terminal apparatus 20 for example. The provision of metadata may be made by the transmission via the network 5 or realized by means of recording media such as a memory card, for example. The provision by the planning terminal apparatus 10 of the program metadata including the above-mentioned production instruction information to the material gathering terminal apparatus 20 for example allows the planning and organization department to instruct the material gathering department for example for scenes to be covered and imaged and the content thereof for example.

The material gathering terminal apparatus 20 is a group of terminals that are used by the material gathering department and is made up of the imaging apparatus 40 and the field PC 50 for example. The material gathering department actually gathers materials at production sites, taking the images of each of the scenes forming each video program and gathering taking situations.

The imaging apparatus 40 is a video camera such as a camcorder for use in gathering materials for broadcast news programs and imaging video content such as game scenes including sports and movies. In the first embodiment, the imaging apparatus 40 is a video signal processing apparatus and configured as a video signal recording apparatus for recording taken video signals.

To be more specific, the imaging apparatus 40 is capable of taking video (including audio) each of scenes forming each video program, for example. This taking processing proceeds by repeating take two or more times. For example, the imaging apparatus 40 makes one or more takes for a certain scene and then one or more takes for another scene. It should be noted that this take denotes a continuous imaging processing from the starting of recording of one session to the end of recording. In other words, this take provides the minimum unit of imaging processing in the imaging phase of each video program. In the fields of video work production, this take is also called "clip", "shot", or "cut", for example.

In addition, the imaging apparatus 40 is capable of recording video signals (image signals and/or audio signals) to a recording medium such as an optical disk 3. In other words, the imaging apparatus 40 is capable of recording the video data generated by imaging processing to corresponding recording media, for example. This video data is the video data and/or audio data representative of the contents taken by the imaging apparatus 40. Such video data is made up of moving image data such as TV program and movie, still image data such as photograph and drawing, audio data such as radio program, subtitle data, or combinations thereof. Further, the imaging apparatus 40 is capable of recording such video data for each take described above. To be more specific, if the imaging apparatus 40 executes take two times for example, two video data files are recorded.

The optical disk 3 to which the above-mentioned video data is recorded is configured in the first embodiment as a mass-storage, next-generation optical disk capable of recording video data of a very large size (several hundred giga bytes for example), for example. However, the optical disk 3 is not restricted to this optical disk; for example, any of various optical disk such as DVD-R, DVD-ROM, DVD-RAM, CD-R, and CD-ROM may also be available. The recording medium to which the imaging apparatus 40 records video data is not restricted to the example of the optical disk 3; for example, a magneto-optical disk such as MO, a magnetic disk such as flexible disk, a magnetic tape such as digital VTR format video tape, or any of various types of RAMs and ROMs may also be available.

In addition, the imaging apparatus 40 is capable of recording not only original video but also low-resolution video to the optical disk 3 as video data, for example. The original video as used herein denotes the raw video data as taken by the imaging apparatus 40. This original video is large in size but high in picture quality and therefore used as a finished video program product. On the other hand, the low-resolution video is the video data obtained by compressing the above-mentioned original video. This low-resolution video is comparatively low in picture quality but small in size and therefore quick and easy in transmission, thereby mainly making it suitable for use in the preliminary editing phase.

Further, the features of the imaging apparatus 40 associated with the first embodiment of the invention are as follows. Namely, the imaging apparatus 40 is capable of acquiring various kinds of metadata from an external device such as the above-mentioned planning terminal apparatus 10 via the network 5 or recording media, for example. The imaging apparatus 40 is also capable of converting the notation format of the metadata acquired from the outside as described above into the notation formation compatible with the imaging apparatus 40. In addition, the imaging apparatus 40 is capable of controlling various processing operations on the basis of the metadata that has become recognizable by the imaging apparatus 40 by the above-mentioned conversion.

The imaging apparatus 40 is also capable of editing the above-mentioned acquired metadata. Moreover, the imaging apparatus 40 is capable of generating metadata such as take metadata (of which details will be described later) on its own. The above-mentioned editing and generation of metadata are executed by describing the metadata in XML for example. The metadata notation format used here may be a notation format with which the imaging apparatus 40 itself is compatible, for example. The details of the above-mentioned features of the imaging apparatus 40 will be described later.

On the other hand, the field PC 50 is based on a note-type personal computer or a portable computer such as PDA (Personal Digital Assistant) and peripheral devices thereof, for example. The field PC 50 is connected with the above-mentioned imaging apparatus 40 by various wired or wireless lines and is capable of sharing metadata and recorded video data for example with the imaging apparatus 40.

The field PC 50 is capable of acquiring metadata from the planning terminal apparatus 10 or the imaging apparatus 40 via the network 5 or recording media, for example. In addition, the field PC 50 may be configured so as to have substantially the same function as the metadata conversion function of the imaging apparatus 40 to be described later. As a result, the field PC 50 becomes able to convert the notation format of the acquired metadata into the notation format compatible with the field PC 50, thereby controlling its various processing operations on the basis of the metadata made recognizable by the field PC 50 by the above-mentioned conversion.

In one example of the above-mentioned processing operations, the field PC 50 is capable of displaying the acquired metadata onto a predetermined display block to make the contents of the metadata recognizable by the personnel of the material gathering department. Also, on the basis of the input made by the personnel of the material gathering department, the field PC 50 is capable of adding shooting situation information that is the metadata associated with the shooting situation at material gathering to the above-mentioned program metadata, for example.

Thus, the field PC 50 is capable of editing the acquired metadata, for example. The metadata editing function of the field PC 50 may be realized by installing metadata editing application software in the field PC 50. It should be noted that the above-mentioned metadata editing processing is executed by describing metadata in XML for example, the metadata notation format at this moment may be any notation format with which the field PC 50 itself is compatible, for example.

If the notation format with which the field PC 50 is compatible is the same as the notation format with which the imaging apparatus 40 is compatible, then the field PC 50 need not have the above-mentioned metadata conversion function. Namely, by acquiring the converted metadata from the imaging apparatus 40, the field PC 50 becomes able to execute various processing operations such as the above-mentioned metadata editing on the basis of the acquired metadata.

The editing terminal apparatus 30 is made up of an information processing apparatus such as a personal computer and a peripheral device thereof for example and installed in the editing department. The editing department edits the video data recorded by the imaging apparatus 40 on the basis of the production instruction and scenario received from the above-mentioned planning and organization department and the material gathering situation and shooting condition obtained in the phase of material gathering, thereby completing each video program, for example. In the first embodiment of the invention, the editing terminal apparatus 30 is the above-mentioned video signal processing apparatus and configured as a video signal reproduction apparatus for reproducing video signals recorded to recording media by the above-mentioned video signal recording apparatus (namely, the imaging apparatus 40).

Namely, the editing terminal apparatus 30 is capable of reproducing the video data recorded to recording media and editing the reproduced video data, for example. To be more specific, for example, the editing terminal apparatus 30 is capable of acquiring video data from the imaging apparatus 40 via the optical disk 3 for example. Also, the editing terminal apparatus 30 is capable of reproducing the video data recorded to the optical disk 3 for example individually for each take or continuously in a suitable manner for example, thereby displaying the reproduced video data. In addition, the editing terminal apparatus 30 is capable of supporting the video data editing processing, for example. This editing processing is made up of preliminary editing processing and main editing processing for example.

In the preliminary editing processing, the video data to be used for editing is collected from a plurality of pieces of video data recorded for each take. Next, from among the collected video data, a necessary video portion is logged. Then, an editing start position (or in-point) or an editing end position (or out-point) corresponding to the logged video portion is set by use of a time code for example, thereby ingesting a necessary portion from among the video data.

In the main editing processing, a plurality of pieces of preliminary-edited video data are extracted and then combined, final picture quality adjustments are executed on the combined video data, thereby creating a complete package data to be broadcast in a television program, for example.

Further, the features of the editing terminal apparatus 30 associated with the first embodiment of the invention are as follows. Namely, the editing terminal apparatus 30 is capable of acquiring various kinds of metadata from external devices such as the imaging apparatus 40 via the network 5 or the optical disk 3, for example. Also, the editing terminal apparatus 30 is capable of converting the notation format of the metadata acquired from the outside into the notation formation with which the editing terminal apparatus 30 is compatible, for example. In addition, the editing terminal apparatus 30 is capable of controlling various processing operations associated with video signals on the basis of the metadata that has become recognizable of the editing terminal apparatus 30 by the above-mentioned conversion.

Moreover, the editing terminal apparatus 30 is capable of editing the acquired data. The editing processing mentioned above is executed by describing metadata in XML for example. The metadata notation format at this moment may be a notation format with which the editing terminal apparatus 30 itself is compatible, for example. The above-mentioned features of the editing terminal apparatus 30 will be detailed later.

Thus, the video program production support system 1 practiced as the first embodiment of the invention and the components thereof have been overviewed. The video program production support system 1 is advantageous in that various kinds of metadata associated with the production of each video program are transferred between the plurality of terminal apparatuses (or video signal processing apparatuses) configuring the system regardless of the difference among the notation formats of the metadata, thereby using the metadata for the production of each video program. This advantage is achieved by the capability of the imaging apparatus 40, the field PC 50, and the editing terminal apparatus 30 that receive metadata for flexibly converting the notation format of the received metadata into the notation format that is recognizable by these apparatuses.

2. Metadata

The following describes in detail the metadata associated with the first embodiment of the invention by use of specific examples.

2.1 Overview of Metadata

"Metadata" denotes the high-order data of a certain collection of various kinds of data and provides an index (or a bookmark) indicative of the contents and attributes these data. Specific examples of the above-mentioned metadata include production instruction information data (or scenario data) for indicating the contents of video program production, shooting situation information data associated with the shooting situations obtained at the time of material gathering, shooting condition information data associated with shooting condition and device setup for each take for the video data, take relation information data for relating the video data shot for every take with a scenario, thumbnail data associated with typical still image in the video data, and electronic mark data associated with the feature points of video data content, for example.

The above-mentioned metadata provides very useful information in the production of each video program. For example, by browsing the above-mentioned metadata, the personnel of each department is able to get the index information about the taken video data and check the contents of production instructions and material gathering results and the relationship between scenario and video data. Also, the above-mentioned terminal apparatuses arranged in the above-mentioned departments are capable of automatically recognizing the above-mentioned metadata, thereby acquiring the setup information and the information about the feature points in the video data and understanding the relationship between scenario and video data.

In addition, although the above-mentioned metadata is useful when it is used independently in each department (or each terminal apparatus), configuring the metadata so as to be available among a plurality of departments (or terminal apparatuses) in common further enhances the production efficiency and quality of each video program.

For the metadata to be shared among a plurality of departments and apparatuses as described above, it is preferable for the notation formats of the metadata to be integrated to a certain extent. Therefore, in the first embodiment of the invention, only one language is used for describing metadata. Consequently, the metadata notation formats may be standardized to some extent, thereby enhancing of metadata compatibility. Further, the first embodiment of the invention uses XML for example as the language to describe the above-mentioned metadata. This XML is an extensible markup language and advantageous in enhancing versatility and ease of mastering its comparatively simple syntax. Therefore, describing the metadata in XML allows unspecified users to easy understand and modify the contents of metadata description.

2.2 Program Metadata

The following describes program metadata that is a specific example of the metadata used in the first embodiment of the invention with reference to FIG. 2. FIG. 2 shows an exemplary configuration of the program metadata associated with the first embodiment of the invention.

Program metadata is tabulated data in which various kinds of metadata necessary for the production of each video program are structured (namely, structured table metadata), for example and is managed by one metadata file for each video program.

As shown in FIG. 2, the above-mentioned program metadata has a layered structure formed by a program identification layer, a material gathering layer, a scene layer, and a cut layer in accordance with material gathering, scene, and cut which are components of each program, for example. It should be noted that "cut" as used herein denotes the minimum unit forming each video program at the stage of planning (namely, at the time a scenario is created). In the example shown in FIG. 2, the video program is composed of 13 cuts. "Scene" as used herein denotes the intermediate unit forming each video program at the stage of planning and composed of one or more cuts. In the example of FIG. 2, the video program is composed of five scenes. "Material gathering" as used herein denotes the maximum unit forming each video program at the stage of planning and is composed of one or more scenes. In the example of FIG. 2, the video program is composed of two scenes. Thus, the program metadata has a tree structure with the program identification layer on top followed downward by the material gathering layer, the scene layer, and the cut layer in this order, the further down, the more segmentalized.

In each layer of program metadata, the material gathering, the scene, and the cut that are entered in upper columns precede in the order of scenarios, for example. For example, of the five scenes forming the video program shown in FIG. 2, the scene entered in the top column is the first scene and the scene entered in the bottom column is the final scene.

The following describes the contents of program metadata having the above-mentioned layered structure. Program metadata includes such metadata as the above-mentioned production instruction information, shooting situation information, and take relating information, for example. Of these pieces of information, the production instruction information and the shooting situation information are constituted as a layer and included in each layer for example. This configuration allows the clear and short representation of the metadata associated with the production instruction (or scenario) of each video program and such intention and recognition of the producer as the information obtained during material gathering. On the other hand, the take relating information is included only in the cut layer for example. The following describes the above-mentioned production instruction information, shooting situation information, and take relating information.

First, the production instruction information is the metadata created by the planning and organization department to indicate the contents of video program production to the material gathering department and the editing department and the metadata corresponding to the scenario of each video program. The production instruction information data is generated by the planning terminal apparatus 10 on the basis of the input made by the personnel of the planning and organization department, for example, and the generated data is written to a corresponding column in the program metadata. By browsing this production instruction information, each department taking its share of the production of each video program is capable of understanding the contents of production instruction and the scenario.

The above-mentioned production instruction information is included in the entire program identification layer and column "material gathering instruction" of the material gathering layer, column "scene instruction" of the scene layer, and column "cut instruction" of the cut layer in the program metadata, for example.

To be more specific, as shown in FIG. 2, the column of the program identification layer includes a video program ID (item [ID]) and a video program title name (item [Ttl]) as the identification data for identifying the video program corresponding to the program metadata concerned, for example.

Column "Material Gathering Instruction" of the material gathering layer includes, as the above-mentioned production instruction information, material gathering ID (item [ID]) unique to each material gathering operation, material gathering title (item [Ttl]), name of cameraman in charge of that material gathering (item [Cam]), name of reporter in charge of that material gathering (item [Rep]), place of that material gathering (item [Plc]), instructions of start and end times of that material gathering (item [Tim]), and contents of material gathering instruction such as purpose and overview of that material gathering (item [Dsc]), for example.

The column "Scene Instruction" of the scene layer includes, as the above-mentioned production instruction information, scene number serially allocated to each of scenes forming material gathering (item [No]) for example, scene title (item [Ttl]), and contents of material gathering instruction (item [Dsc]) for scene instruction such as overview and development of that scene, for example.

Column "Cut Instruction" of the cut layer includes, as the above-mentioned production instruction information, cut number serially allocated to each of cuts forming a scene (item [No]) and cut title for directing contents of cut to be shot (item [Ttl]), for example.

The shooting situation information is metadata associated with the shooting situation corresponding to each of the layers (for example, the cut layer, the scene layer, and the material gathering layer) above the cut layer for example. This shooting situation information is generated by the field PC 50 on the basis of the input made by the personnel of the material gathering department for example and the generated information is written to the corresponding column in the program metadata. By browsing this shooting situation information, each of the departments taking their share of video program production is capable of understanding the shooting situation at the time of video shooting.

The above-mentioned shooting situation information is included in column "Material Gathering Memo" of the material gathering layer, column "Scene Memo" of the scene layer, and column "Cut Memo" of the cut layer in the program metadata.

To be more specific, column "Material Gathering Memo" of the material gathering layer includes, as the above-mentioned shooting situation information, such information as the contents of material gathering memo (item [Dsc]) including remarks by the material gathering personnel about his/her impressions throughout the material gathering operation, notes, and suggestions, characteristics and impressions of material gathering site, and incidents took place throughout the material gathering operation, for example.

Column "Scene Memo" of the scene layer includes, as the above-mentioned shooting situation information, such information as the contents of scene memo (item [Dsc]) including remarks by the material gathering personnel about his/her impressions at the scene level, notes, and suggestions, characteristics and impressions of material gathering site, and incidents that took place in the scene shooting operation, for example.

Column "Cut Memo" of the cut layer includes, as the above-mentioned shooting situation information, such information as the contents of cut memo (item [Dsc]) including remarks by the material gathering personnel about his/her impressions at the cut level, notes, and suggestions, characteristics and impressions of material gathering site, and incidents that took place in the scene shooting operation, for example.

The take relating information is metadata for relating the above-mentioned take video data with a cut. The take relating information is generated by the material gathering terminal apparatus 20 or the editing terminal apparatus 30 on the basis of the input made by the personnel of the material gathering department or the editing department and the generated information is written to column "Take Relating Information" in the cut layer of the program metadata, for example. By browsing this take relating information, each of the departments taking their share of the production of each video program is capable of understanding which take is allocated to a particular cut. Further, the take relating information also allows the editing terminal apparatus 30 for example to automatically determine the relationship between cut and take, for example.

To be more specific, this take relating information is made up of "Take Data" ("Take Number", "In Point" and "Out Point") information, "OK/NG" information, "Video File Name" information, "Low Resolution File Name" information, and "Take Metadata File Name" information, for example, as shown in FIG. 2.

Column "Take Data" includes take number (item [No]) unique to each take, In-point information (item [In-point]) that is the time code for the editing start position (In-point) determined in an editing operation, and Out-point information (item [Out-point]) that is the time code for the editing end position (Out-point), for example.

Column "OK/NG" includes OK/NG information indicative which of one or more takes related with the cut concerned is selected ("OK") or not selected ("NG"), for example.

Column "Video File Name" includes the information about the name of file to which the original video of that take is recorded, column "Low Resolution File Name" includes the information about the name of file to which the low-resolution video of that take is recorded. Column "Take Metadata File Name" includes the information about the name of the file of take metadata (to be described later) corresponding to the related take.

The take relating information including the above-mentioned information can make each take subordinate to a cut in the program metadata. For example, in the example shown in FIG. 2, two links identified by take numbers "1" and "2" are linked to a cut identified by program ID "P2002-10", material gathering ID "A2002-1001", scene number "1" and cut number "1" (namely, the cut in the top column). Thus, the take relating information has a function of linking a cut intended by the planning and organization department to an actual video material obtained by the material gathering department.

Thus, the configuration and contents of the program metadata have been described with reference to FIG. 2. It should be noted that the contents of the program metadata are not restricted to the above-mentioned example; for example, the program metadata may also include such various kinds of metadata associated with the production of video program as instruction for material gathering equipment, production schedule, job progress situation, typical still image (thumbnail data), and memo associated with jobs by other departments.

It should be noted that FIG. 2 shows the program metadata in the notation format of table for the convenience of description. Actually, however, the program metadata is XML document data written in XML for example.

The following describes description example of the program metadata associated with the first embodiment written in XML with reference to FIGS. 3 and 4. FIGS. 3 and 4 illustrate description example of the program metadata described above with reference to FIG. 2, written in XML.

As shown in FIGS. 3 and 4, the program metadata is written in the XML notation format uniquely developed for program metadata by the applicant hereof for example. That the notation format of program metadata concerned is the above-mentioned unique XML notation format may be identified by the tag (namely, "B" tag) of substantially start tag <Program-Metadata id="P2002-10" title="Boundary of Noodle Soup Color Between East and West Japan">.

The following describes in detail the contents of the description of the program metadata. First, part "A" declares XML. Parts "B" and "B'" describe the information included in the above-mentioned program identification layer, thereby allowing the determination to which video program the program metadata concerned belongs. "C" and "C'" tags indicate that program data content is described between these tags.

Part "D" describes the information included in "Material Gathering Instruction" of the above-mentioned material gathering layer for the material gathering with material gathering ID "A2002-1001". Part "E" describes the information included in "Material Gathering Memo" for the material gathering concerned.

Part "F" describes the information included in the scene layer and the cut layer for the scene having scene number 1 (hereafter referred to as scene 1, the same holding for other numbers and other layers) in the above-mentioned material gathering. To be more specific, scene 1 is made up of cut 1 and cut 2 for example, take 1 and take 2 are subordinate to cut 1, and take 3 is subordinate to cut 2. Therefore, part "G" describes the information included in "Cut Instruction" and "Cut Memo" of the cut layer for cut 1 and the information included in "Take Relating Information" for take 1 and take 2. On the other hand, part "H" describes the information included in "Cut Instruction" and "Cut Memo" of the cut layer for cut 2 and the information included in "Take Relating Information" for take 3. Part "I" describes the information included in "Scene Memo" for scene 1.

Part "J" describes the information included in the scene layer and the cut layer for scene 2 in the above-mentioned material gathering as with scene 1. It should be noted that part "J" is followed by the metadata about the material gathering with ID "A2002-1002", which is omitted.

Thus, the description example of the program metadata written in XML has been described. In the above-mentioned description example, tags <Assignment>, <Scene>, <Cut>, and <Take> are used to divide the metadata included in the program metadata for ease of description, thereby allowing any user to easily understand and modify the program metadata. It should be noted that, in the above-mentioned description example, the metadata notation format such as tag name and XML document structure is that uniquely developed by the applicant hereof for example but the notation format is not restricted thereto; for example, the program metadata having similar contents may be described in another metadata notation format to be described later.

2.3 Take Metadata

The following describes in detail take metadata that is a specific example of the metadata used in this first embodiment of the invention, with reference to FIG. 5. FIG. 5 illustrates a configuration of the take metadata associated with the first embodiment.

As shown in FIG. 5, take metadata is associated with the shooting situation and shooting condition corresponding to each individual take, for example, and is managed by one metadata file for each take, for example. When the video data of a take is recorded by the imaging apparatus 40, the take metadata is created for the video data of this take, one to one, for example. In other words, every time a take is done, a new take metadata file is created. The take metadata mentioned above may be related with a cut in the above-mentioned cut layer along with the video data of the same take on the basis of the take relating information in the above-mentioned program metadata, for example.

The following describes in detail the contents of take metadata. Take metadata includes metadata such as take shooting condition information and take shooting situation information. The take shooting condition information is objective metadata associated with take shooting condition, device setup information, and shooting status, for example. The take shooting condition information is automatically generated by the imaging apparatus 40 for example and written to the take metadata. The take shooting situation information is subjective metadata associated with the shooting situation at the take shooting processing level, for example. The take shooting situation information is generated by the field PC 50 for example on the basis of the input made by the material gathering department personnel and written to the take metadata.

To be more specific, as shown in FIG. 5, take metadata includes, as the above-mentioned take shooting situation information, such information as contents of take memo (item [Dsc]) including messages, notes, and suggestions by the material gathering personnel at the time of take shooting, characteristics and impressions of the take, incidents that took place in a take shooting operation, and items associated with the video data of that take, for example.

The take metadata also includes, as the above-mentioned take shooting condition information, date on which the take concerned was shot (item [Date]), time at which the take was shot (item [Time]), longitude and latitude information about the place at which the take was shot (GPS information for example) (item [Pos]), the model and device number of the imaging apparatus 40 with which the take was shot (item [Machine]), and device setting information (item [Setup]), for example.

Of the above-mentioned pieces of information, the device setting information is the setup information of the imaging apparatus 40 with which the take was shot, for example. This device setting information includes the type of camera filter used at take shooting and the states (switch on/off states and levels for example) of white balance switch, gain switch, DCC (Dynamic Contrast Control) switch, shutter switch, and extender switch, for example.

In addition, take metadata may include the thumbnail data associated with a typical still image in corresponding video data and the electronic mark data associated with the feature point of content of video data concerned, for example.

Also, the take relating information included in the above-mentioned program metadata may be included in take metadata, for example. Namely, take metadata TM may include video data file name information of corresponding video data, low-resolution file name information, in-point and out-point information of video data concerned, take number, and OK/NG information, for example.

Thus, the configuration and contents of metadata have been described with reference to FIG. 5. Referencing the take metadata such as described above allows each of the departments taking their share of the production of each video program to understand the contents, shooting condition, and device setup state of the video data corresponding to the take metadata. These pieces of information in take metadata are useful especially in editing video data in the editing department, for example.

Meanwhile, in FIG. 5, take metadata is presented in the notation format of a table for the convenience of description. Actually however, the take metadata such as above is XML document data written in XML for example.

The following describes an exemplary description of take metadata written in XML associated with the first embodiment of the invention, with reference to FIG. 6. FIG. 6 illustrates the exemplary description of the take metadata written in XML described above with reference to FIG. 5.

As shown in FIG. 6, the take metadata is described in the XML notation format uniquely developed by the applicant hereof for program metadata, for example. That the notation format of program metadata concerned is the above-mentioned unique XML notation format may be identified by the tag (namely, tag in part "B") of substantially start tag <TakeMetadata no="1">.

The following describes in detail the contents of the description of the take metadata. First, part "A" declares XML. Parts "B" and "B'" describe the information for identifying take metadata, thereby determining to which take the take metadata concerned belongs.

Part "C" describes the take shooting situation information (namely, contents of take memo) associated with the take concerned. Part "D" describes the information about the date, time, and longitude and latitude at which the take concerned was shot. Part "E" describes the model and device number and device setting information of the imaging apparatus 40 with which the take concerned as shot.

Thus, an exemplary description of take metadata in XML has been described. It should be noted that, in the above-mentioned example, the metadata notation format such as tag name and XML document structure is that uniquely developed by the applicant hereof for example but the notation format is not restricted thereto. The take metadata having similar contents may be described in another metadata notation format to be described later.

2.4 Another Metadata Notation Format

In the above-mentioned examples, program metadata and take metadata are written in the XML-based notation format uniquely developed by the applicant hereof for example. However, the metadata associated with the first embodiment of the invention may also be written in any other XML-based notation formats used in the field of video work production. There are a variety of metadata written in such XML-based notation formats depending on the policies of standardization organizations and users' individual demands. Specific examples thereof include "Dublin Core metadata", "MPEG-7 metadata", "Geneva Scheme metadata", "MOS metadata", and "customer unique metadata", for example.

To be more specific, "Dublin Core metadata" is written in the standard specification established by Dublin Core Metadata Initiative, featuring the standardization and description of the small, limited number of elements. "MPEG-7 metadata" is based on the MPEG-7 (Moving Picture Expert Group) standard. "Geneva Scheme metadata" is the XML version of MXF Geneva Scheme under review by BPRL. "MOS metadata" is based on the MOS (Media Object Server) protocol. "Customer unique metadata" is created by each user on the basis of the above-mentioned standardized metadata or uniquely in accordance with user's demand.

3. Overview of Metadata Conversion

The following outlines the conversion of the metadata associated with the first embodiment of the invention.

Each of the terminal apparatuses forming the above-mentioned video program production support system 1 has a metadata application processing block for interpreting XML-based metadata for example and executes predetermined processing on the basis of the interpreted metadata. This metadata application processing block is configured for the metadata having a particular notation format for example and therefore cannot recognize and process the metadata having other notation formats.

On the other hand, with XML, the syntax is strictly specified, so that the notation format of the metadata written in XML may easily be converted by the of XSLT (Extensible Stylesheet Language Transformations) for example. Therefore, installing a conversion engine such as the XSLT engine for example on the input/output processing block of the above-mentioned metadata application processing block allows the metadata application processing block to cope with the input/output of the metadata having any notation format.

The following outlines the metadata conversion by use of the above-mentioned XSLT engine with reference to FIG. 7. FIG. 7 schematically illustrates the metadata conversion by use of the XSLT engine associated with the first embodiment of the invention.

As shown in FIG. 7, the metadata input/output processing block of each terminal apparatus such as the imaging apparatus 40 has an XSLT engine 70, for example. The XSLT engine 70 is capable of converting, by use of a conversion table 74, metadata 72 having a given notation format based on XML (hereafter referred to as external metadata) into metadata 76 having a notation format that can be handled by a metadata application processing block 80 (hereafter referred to as internal metadata). The conversion table 74 is a conversion definition document defining conversion rules for conversion between the external metadata and the internal metadata, which is an XSL (extensible Stylesheet Language) document.

The conversion table 74 such as the XSL document and the XSLT engine 70 are standard technologies generally used in the field of XML and easy in understanding the description contents and structure thereof, with various effective converted data generating tools available. Hence, any user is able to easily customize the conversion table 74 and the XSLT engine 70.

The metadata application processing block 80 arranged in the above-mentioned terminal apparatus is capable of accessing the above-mentioned internal metadata via standard API (Application Programming Interface) 78 of DOM (Document Object Model) for example. The internal metadata 76 has been converted by the above-mentioned XSLT engine 70 into a notation format that can be handled by the metadata application processing block 80. Therefore, the metadata application processing block 80 is capable of recognizing the internal metadata 76 to execute predetermined processing on the basis of the recognized metadata.

As described above, installing a conversion engine such as the XSLT engine 70 for example into the metadata input/output processing block allows each terminal apparatus such as the imaging apparatus 40 to easily recognize and process the metadata having any notation format provided from the outside only by separately preparing the predetermined conversion table 74.

On the other hand, the XSLT engine 70 is capable of reversely converting the internal metadata 76 into the external metadata 72 having any notation format by use of the conversion table 74, for example. Consequently, each terminal apparatus is also capable of converting the internally generated and edited metadata into metadata having a notation format for use by external equipment and outputting the converted metadata.

4. Imaging Apparatus

The following describes in detail the imaging apparatus 40 that is a video signal recording apparatus associated with the first embodiment of the invention as a video signal processing apparatus having the above-mentioned metadata conversion capability.

4.1 Configuration of the Imaging Apparatus

Figure 8:
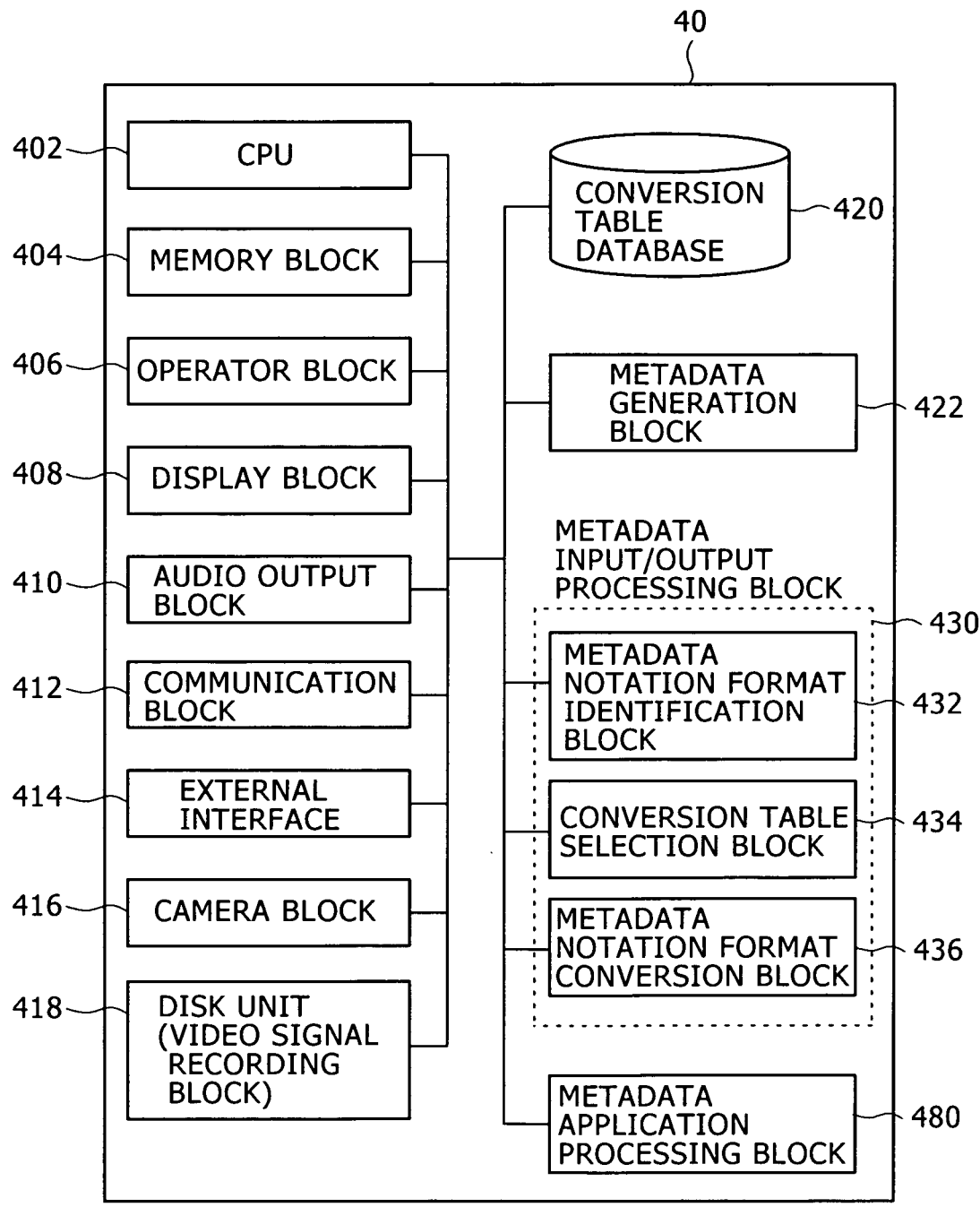
FIG. 8 is a block diagram illustrating an approximate configuration of an imaging apparatus practiced as the first embodiment.

First, a configuration of the imaging apparatus 40 associated with the first embodiment of the invention will be described with reference to FIG. 8. FIG. 8 is a block diagram illustrating an approximate configuration of the imaging apparatus 40 associated with the first embodiment of the invention.

As shown in FIG. 8, the imaging apparatus 40 has a CPU 402, a memory block 404, an operator block 406, a display block 408, a audio output block 410, a communication block 412, an external interface 414, a camera block 416, a disk unit 418, a conversion table database 420, a metadata generation block 422, a metadata input/output processing block 430, and a metadata application processing block 480.

The CPU 402 functions as a calculation processing unit and a control unit, controlling the processing of the components of the imaging apparatus 40. The memory block 404 is based on a RAM, a ROM, or a flash memory, for example, and has a capability of storing or temporarily storing various kinds of data associated with the processing by the CPU 402 and operation programs thereof.

The operator block 406 has operating means such as buttons, levers, dials, and a touch panel for example. A cameraman manually operates the operator block 406 to perform power on/off operation, shooting operation, video data recording/reproducing operation, zoom operation, mode switching operation, and metadata browsing, creating, and editing operations, for example. On the basis of any of the above-mentioned operations done by the cameraman, the CPU 402 generates command signals for making components of the camera block 416 execute various processing operations such as lens aperture control or zoom control and recording start and end operations, for example. The operator block 406 also has the above-mentioned filter switch, white balance switch, gain switch, DCC switch, shutter switch, and extender switch, for example.

The display block 408 is a display unit and is based on a viewfinder and a LCD monitor, for example. The display block 408 is capable of displaying the video data being shot or the reproduced video data, for example. This allows the cameraman to check a subject of shooting, monitor during shooting, check the video data recorded to the optical disk 3, and edit the video data in a simple manner, while viewing the display block 408, for example. In addition, the display block 408 is capable of displaying setup information and various metadata such as the above-mentioned program metadata solely or as superimposed on video.

The audio output block 110 is based on a sounding device such as a loudspeaker and an audio data processing unit for example, outputting the audio of video data for example. Also, the audio output block 110 is capable of audibly outputting the metadata such as production instruction information read by the metadata application processing block 480 to be described later, for example.

The communication block 412 allows the transmission and reception of various kinds of metadata and various kinds of data such as low-resolution video data with the external devices such as the planning terminal apparatus 10 and the editing terminal apparatus 30 via the network 5, for example. For example, the communication block 412 receives the metadata provided by an external device and outputs the received metadata to the metadata input/output processing block 430. In addition, if the above-mentioned data is transmitted through SDI (Serial Digital Interface) via the network 5 for example, the communication block 412 is capable of encoding the data by use of KLV (Key Length Value) encoding for example.

The external interface 414 allows data transmission and reception with peripheral devices connected to the imaging apparatus 40 with USB (Universal Serial Bus) or SCSI (Small Computer System Interface) for example. In addition, the external interface 414 is cable of functioning as an interface for accessing a memory card, a memory stick, a flexible disk, and other recording media for reading/writing various kinds of data such as metadata.

The camera block 416 has capabilities of executing imaging processing to generate video data. The camera block 416 has an imaging block for taking a picture of a subject to output a video signal, a microphone block for picking up sound in the shooting environment to generate an audio signal, a video processor for processing a video signal composed of video signal and audio signal, a video compression block for compressing the video signal by MPEG1 or MPEG2 for example to generate the above-mentioned low-resolution video, and a time code generation block for generating and attaching a time code to video data (all of these blocks not shown), for example.

Of these blocks, the imaging block is composed of an optical block, a drive block, and an imaging device such as CCD (Charge Coupled Device), for example. The optical block is composed of a lens, an aperture diaphragm, and a filter, for example, and throws an optical image of a subject onto the imaging device. The drive block is capable of controlling lens aperture, zoom, exposure, and focusing, for example. The imaging device converts the above-mentioned optical image into an electrical video signal by photoelectrical conversion through a plurality of pixels based on photo conversion elements arranged on a photo reception surface in a two dimensional manner and outputs the electrical video signal.

The video processor performs A/D conversion processing, gain control (AGC) processing, white balance processing, γ (gamma) correction processing, shading processing, aperture processing for edge correction, and CDS (Correlated Double Sampling circuit) processing for noise reduction on the video signals generated by the imaging block, for example. Also, the video processor is capable of processing audio signals.

The disk unit 418 is capable of recording the video data (or video signals) generated by the camera block 416 to a recording medium such as the optical disk 3, for example. Also, the disk unit 418 is capable of recording the metadata generated and edited by the metadata generation block 422 to the above-mentioned recording medium, for example. In this point of view, the disk unit 418 is capable of functioning as a video signal recording block for recording video signals and metadata to a recording medium in a related manner. In addition, the disk unit 418 is capable to reproducing the video data recorded to the above-mentioned recording medium, for example. Further, the disk unit 418 is capable of reading the metadata from a recording medium provided from the outside and outputting the read metadata to the metadata input/output processing block 430.

The conversion table database 420 is a feature block associated with the first embodiment of the invention and a recording unit for storing the conversion table of the above-mentioned metadata, for example. This conversion table is an XSL document for example in which the conversion definition between the metadata provided from the outside (namely, the above-mentioned external metadata) and the metadata having a notation format that may be handed by the imaging apparatus 40 (namely, the above-mentioned internal metadata) is described. The conversion table database 420 includes a plurality of conversion table for example corresponding to various kinds of external metadata. It should be noted that the above-mentioned conversion table may be provided from the outside via the network 5 or a recording medium such as memory card or generated inside the imaging apparatus 40 on the basis of the input made by the material gathering department personnel, for example.

The metadata generation block 422 has a capability of newly generating metadata such as take metadata, for example.

To be specific, the metadata generation block 422 is capable of newly creating take metadata for each take and entering the above-mentioned take shooting condition information for example as the content of the created take metadata, for example.

To be more specific, if shooting processing for one take has been executed by the camera block 416, the metadata generation block 422 automatically creates a file of the take metadata associated with that take. Next, the metadata generation block 422 gathers the shooting condition and setup information associated with that take from each block of the imaging apparatus 40 for example, automatically creating the above-mentioned take shooting condition information. For example, the metadata generation block 422 is capable of getting, from the above-mentioned time code generation block, the information about the date and time at which the shooting of that take started and, from the memory block 404 for example, such setting information of the imaging apparatus 40 as AGC gain level, white balance switch status, and DCC switch on/off status, for example. Further, the metadata generation block 422 writes the take shooting condition information generated as described above to a file of the above-mentioned newly generated take metadata for example in the notation format of the internal metadata based on XML. It should be noted that the take metadata and so on created as described above are recorded to the memory block 404 or the optical disk 3 for example.

The metadata input/output processing block 430 is a feature block associated with the first embodiment of the invention and has a capability of converting the external metadata into the internal metadata and outputting the internal metadata to the metadata application processing block 480 as described above with reference to FIG. 7, for example. The metadata input/output processing block 430 has a metadata notation format identification block 432, a conversion table selection block 434, and a metadata notation format conversion block 436, for example.

The following describes in detail the functions of the above-mentioned component blocks of the metadata input/output processing block 430 with reference to FIGS. 9 through 11. FIG. 9 shows an exemplary description of material gathering instruction information based on MOS metadata, one example of external metadata. FIG. 10 shows a specific example of the conversion table corresponding to the MOS metadata and the internal metadata. FIG. 11 shows an exemplary description of the material gathering instruction information based on the converted internal metadata.

The metadata notation format identification block 432 has a capability of identifying the notation format of external metadata. To be more specific, the external metadata provided from the outside such as the planning terminal apparatus 10 is inputted in the metadata notation format identification block 432 via the communication block 412, the external interface 414, or the disk unit 418, for example. Assume that this external metadata is written in XML for example, but is different in notation format from internal metadata.

The metadata notation format identification block 432 is capable of detecting tags from the external metadata inputted as described above to identify the notation format of this external metadata. Namely, for the metadata written in XML, the start tag is specified for each type of metadata. Hence, the metadata notation format identification block 432 is capable of detecting the head or end start tag written in the external metadata for example, thereby identifying the type of that external metadata.

For example, MPEG-7 metadata always starts with tag <Mpeg7> and ends with tag </Mpeg7>. Therefore, upon detection of tags <Mpeg7> and </Mpeg7>, the metadata notation format identification block 432 identifies that the metadata concerned is the metadata written in <Mpeg7> format. Also, for example, upon detection of tags <TakeMetadata> and </TakeMetadata>, the metadata notation format identification block 432 identifies that the metadata concerned is the take metadata written in the notation format unique to the applicant hereof.

To be more specific by use of an actual example of external metadata, it is assumed that the external metadata as shown in FIG. 9 be inputted in the metadata notation format identification block 432, for example. In this example, the metadata notation format identification block 432 detects head and end tags <mos> and </mos>, thereby identifying that this external metadata is MOS metadata.

The conversion table selection block 434 has a capability of selecting a conversion table corresponding to the notation format of the external metadata identified by the metadata notation format identification block 432 from among a plurality of conversion tables for example recorded to the conversion table database 420. Namely, the conversion table selection block 434 is capable of selecting a conversion table for converting the external metadata into the internal metadata.

For example, if the type of the external metadata is identified as the MOS metadata as shown in FIG. 9, then the conversion table selection block 434 selects the conversion table corresponding to the MOS metadata that is the external metadata and the program metadata having the format unique to the applicant hereof that is the internal metadata. The selected conversion table describes the tag name conversion rules for converting the tags in the MOS metadata into the tags of the internal metadata as shown in FIG. 10. For example, the above-mentioned rules specify that tag <afObj> of the MOS metadata be converted into tag <Acquisition> of the internal metadata. Also, the rules specify that tag <afID> of the MOS metadata be converted into tag <Assignment@id> of the internal metadata, for example. The conversion into tag <Assignment®id> denotes that the contents of element "afID" of the MOS metadata are described as the id attribute of element "Assignment" of the internal metadata.

The metadata notation format conversion block 436 has a capability of converting the notation format of external metadata into the notation format of internal metadata on the basis of the conversion table selected by the above-mentioned conversion table selection block 434. The metadata notation format conversion block 436 is based on a conversion engine such as an XSLT engine for example and corresponds to the XSLT engine 70 shown in FIG. 7. The metadata notation format conversion block 436 thus configured converts the tags of external metadata for example into the tags of internal metadata in accordance with the conversion table selected above.

To be specific, the metadata notation format conversion block 436 converts, on the basis of the conversion table shown in FIG. 10, the material gathering instruction metadata compliant with the MOS metadata shown in FIG. 9 into the material gathering instruction metadata compliant with the internal metadata shown in FIG. 11 (namely corresponding to a part of column "Material gathering instruction" of program metadata), for example. As shown in FIGS. 9 and 11, parts "A" and "A'", "B", "C" and "C'", "D", and "E" of the external metadata shown in FIG. 9 correspond to parts "a" and "a'", "b", "c" and "c'", "d" and "d'", and "e" of the internal metadata shown in FIG. 11.

To be more specific, for the part ("A" and "A'") to ("a" and "a'"), tag "mos" for example is converted in tag "ProgramMetadata" for example.

For the part "B" to "b", tags <mosID> and <ncsID> are converted into tags <mos:mosID> and <mos:ncsID> because this part is an item unique to external metadata and therefore the conversion table has no corresponding definition. Such an item unique to external metadata is held by converting it into a tag including its name space (to be specific, prefix "mos:" is attached), for example.

For part ("C" and "C'") to ("c" to "c'"), tag <afObj> is converted into tag <Acquisition> for example.

For part "D" to "d", tags <afID> and <afSlug> for example are integrally converted into tag <Assignment> for example and the contents of afID and afSlug elements are described as id attribute and title attribute of Assignment element.

For part "D", tags <photographer>, <reporter>, and <description> for example are converted into tags <Cameraman>, <Reporter>, and <Description> for example.

Thus, the metadata notation format conversion block 436 is capable of converting the notation format of external metadata into the notation format of internal metadata that may be handled by the metadata application processing block 80. Therefore, the metadata application processing block 480 becomes able to recognize and process the metadata thus converted.

It should be noted that the metadata elements of external metadata and internal metadata are not always corresponding to each other one to one, but, by converting items unique to external metadata into tag names including their name spaces and holding these tag names, the metadata application processing block 480 is capable of not only efficiently skipping these items but also holding the original information if reverse conversion is required, for example.

On the other hand, the items that are defined in internal metadata but do not exist in external metadata (for example, FieldNote and Scene elements) may not simply generated at the conversion into internal metadata.

Next, the metadata application processing block 480 has a capability of controlling various processing operations such as the processing associated with video signals in the imaging apparatus 40 on the basis of the metadata with the above-mentioned notation format converted, for example. In this point of view, the metadata application processing block 480 functions as a control processing block associated with the first embodiment of the invention.

As described above, the metadata notation format conversion block 436 is capable of converting the notation format of external metadata that cannot be handled by the metadata application processing block 480 into the notation format of internal metadata that can be handled by the metadata application processing block 480, for example. The metadata application processing block 480 is capable of interpreting a metadata file thus converted, thereby extracting necessary metadata, for example. Further, by use of the extracted metadata, the metadata application processing block 480 is capable of executing various application processing operations in the imaging apparatus 40.

The following describes a specific example of the metadata-based control processing by the metadata application processing block 480.

First, the re-setup of the imaging apparatus 40 by the metadata application processing block 480 will be described. If the metadata application processing block 480 has acquired the metadata including the setup information recorded at a previous shooting operation for example, the metadata application processing block 480 may use various kinds of setup information extracted from that metadata, thereby setting up the imaging apparatus 40 the same shooting status as before for example again.

To be more specific, when the take metadata recorded at the last or previous take shooting has been provided for example, the metadata application processing block 480 extracts various kinds of setup information at the time of that take shooting from that take metadata. These pieces of setup information include lens-associated information such as types of filter and extender, video signal processing values associated with white balance control, shading correction, gamma correction, gain control, and DCC, and switch states, for example. The metadata application processing block 480 transmits setup commands based on these kinds of setup information to the camera block 416 for example, thereby controlling each component of the camera block 416 to the same shooting state as before. Consequently, this allows the imaging apparatus 40 to be restored to the last shooting status for example. Thus, automatically executing re-setup by the metadata application processing block 480 on the basis of metadata makes it unnecessary for the cameraman for example to manually repeat the required complicated setup, thereby significantly enhancing user-friendliness.

The following describes metadata display control processing to be executed by the metadata application processing block 480. The metadata application processing block 480 is capable of executing display control processing for displaying the interpreted metadata onto the display block 408.

To be more specific, the metadata application processing block 480 is capable of interpreting metadata such as inputted program metadata and take metadata for example, thereby converting the items in the metadata into a table format to make it easy for these times to be individually handled. Further, the metadata application processing block 480 is capable of controlling for displaying these program metadata and take metadata converted into a table format for example onto the display block 408 such as a viewfinder or a LCD monitor. At this moment, the metadata application processing block 480 is also capable of displaying items of program metadata for example in a selected manner, for example. The metadata display control processing such as above allows the cameraman for example to browse the take metadata having a table format to easily recognize the number of scenes and cuts to be shot and the organization of shooting, for example. Also, by browsing take metadata, the cameraman for example becomes able to check the shooting condition for example of each shot take.

The following describes metadata audio conversion/reproduction processing to be executed by the metadata application processing block 480. The metadata application processing block 480 is capable of interpreting metadata such as program metadata or take metadata for example to convert the metadata into audio signals, thereby controlling such that the contents of the metadata be audibly outputted from the audio output block 410, for example. This metadata audio conversion/reproduction processing allows the cameraman for example to listen to the contents of material gathering instruction of the program metadata read aloud, thereby easily recognizing the number of scenes and cuts to be shot and the organization of shooting, for example. Also, the listening to the contents of the metadata, the cameraman for example becomes able to check the shooting condition of the shot take.

The following describes video data thumbnail display control processing to be executed by the metadata application processing block 480. The metadata application processing block 480 is capable of recognizing a thumbnail data value that is the metadata indicative of a typical still image point (a time code for example) in video data. Further, the metadata application processing block 480 is capable of controlling for thumbnail-displaying a frame in video data corresponding to the recognized thumbnail data value onto the display block 408. This video data thumbnail display control processing allows the provision of the visual index information of shot video data) or video material to the cameraman for example.

The following describes the processing of relating scenarios with video materials to be executed by the metadata application processing block 480. If the metadata application processing block 480 has acquired program metadata including production instruction information (namely, a scenario) for example, the metadata application processing block 480 is capable of relating the video material such as the video data of a shot take with that program metadata.

To be more specific, every time take shooting processing is executed, the metadata application processing block 480 is capable of automatically generating for example the take relating information composed of the above-mentioned take number, OK/NG information, video file name, low-resolution file name, and take metadata file name for example and additionally entering the generated information into the column of the cut layer of the above-mentioned program metadata. By entering the take relating information as described above, the metadata application processing block 480 is capable of relating the video data and make data of the take concerned with the cut in the above-mentioned program metadata. With which cut the video material for example of the take concerned is to be related is determined by a cut selecting operation by the cameraman for example. In the cut selecting operation, the cameraman for example touches panel buttons for example to select a cut for allocating a take to be shot or a already shot take from among a plurality of cuts included in the production instruction information of the program metadata displayed above, for example.

Thus, the metadata application processing block 480 is capable of additionally enter the generated take relating information into program metadata, thereby editing the program metadata. As a result, the metadata application processing block 480 becomes able to relate a production instruction (or a scenario) with a video material.

The above-mentioned examples of the application processing based on metadata by the metadata application processing block 480 are illustrative only; for example, the metadata application processing block 480 is also capable of controlling various other processing operations in the imaging apparatus 40, such as various processing operations associated with video signals.

4.2 Processing Method of the Imaging Apparatus

The following describes a metadata-associated processing method to be executed in the imaging apparatus 40 associated with the first embodiment of the invention, with reference to FIG. 12. FIG. 12 is a flowchart indicative of this processing method in the imaging apparatus 40.

As shown in FIG. 12, first, in step S102, externally provided metadata having a given notation format based on XML (namely, external metadata) is acquired (step S102). The imaging apparatus 40 gets external metadata from an external device such as the planning terminal apparatus 10 via the network 5 or a recording medium, for example. To be more specific, in the acquisition via the network 5, the communication block 412 of the imaging apparatus 40 receives external metadata transmitted via the network 5 and outputs the received external metadata to the metadata input/output processing block 430. On the other hand, in the acquisition via a recording medium, the external interface 414 or the disk unit 418 reads external metadata from the recording medium and outputs the external metadata to the metadata input/output processing block 430.

Next, in step S104, the notation format of the metadata acquired above is identified (step S104; metadata notation formation identification process). The metadata notation format identification block 432 of the metadata input/output processing block 430 detects the start tag from the inputted external metadata file to identify the notation format of that external metadata, for example. If tag <mos> is detected for example, the metadata notation format identification block 432 identifies that the type of that external metadata is MOS metadata.

Further, in step S106, the identified metadata notation format is determined whether it is compatible with the imaging apparatus 40 (step S106). For example, the metadata notation format identification block 432 has, in advance, the knowledge of the metadata notation format (namely, internal metadata notation formats) that can be handled by the metadata application processing block 480 for example of the imaging apparatus 40. Therefore, the metadata notation format identification block 432 is capable of determining whether the notation format of external metadata identified in step S104 is identical to this known notation format of internal metadata. If the external metadata notation format is found incompatible with the metadata application processing block 480, then the procedure goes to step S108; if the external metadata notation format is found compatible, then the procedure goes to step S112.

In step S108, the conversion table corresponding to the metadata notation format identified above is selected (step S108; conversion table selection process). The conversion table selection block 434 selects one conversion table corresponding to the external metadata notation format identified in step S104 and the internal metadata notation format from among a plurality of conversion tables recorded to the conversion table database 420, for example.

In step S110, the conversion of the metadata notation format is executed on the basis of the selected conversion table (step S110; metadata conversion process) On the basis of the conversion table selected in step S108, the metadata notation format conversion block 436 converts the external metadata notation format into the internal metadata notation format. Consequently, the notation format of the acquired external metadata is converted into the notation formation that can be recognized by the metadata application processing block 480.

In step S112, various metadata application processing operations are executed (step S112; processing control process). On the basis of the metadata made recognizable after notation format conversion, the metadata application processing block 480 controls various processing operations in the imaging apparatus 40 as described above, for example. Also, the metadata application processing block 480 is capable of directly recognizing and processing the external metadata of which notation format is found to be approximately the same with the notation format of internal metadata in step S106, for example.

5. Editing Terminal Apparatus

The following describes the editing terminal apparatus 30 that is a video signal reproduction apparatus associated with the first embodiment of the invention as a video signal processing apparatus having the above-mentioned metadata conversion capability.

5.1 Configuration of the Editing Terminal Apparatus

Figure 13:
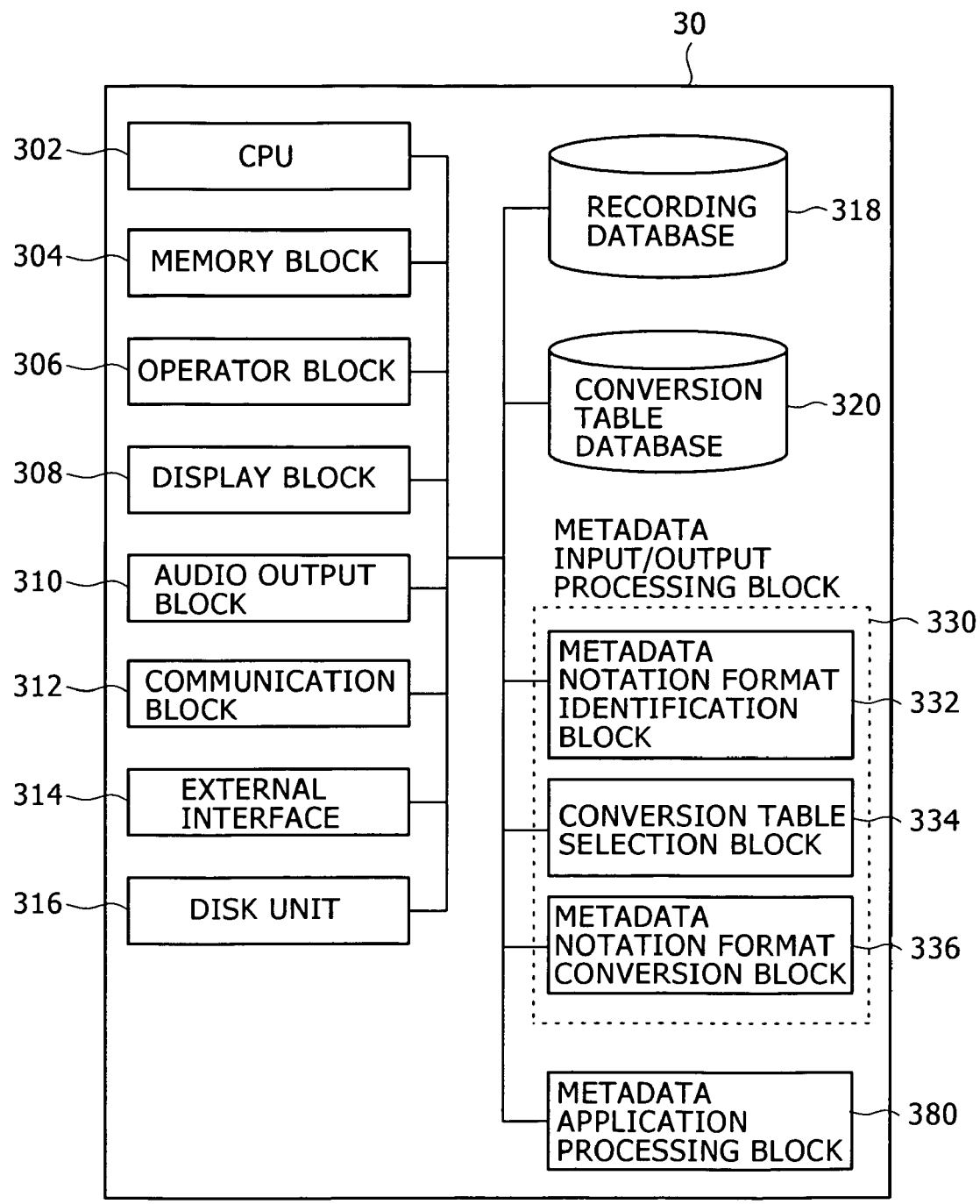
FIG. 13 is a block diagram illustrating an approximate configuration of an editing terminal apparatus practiced as the first embodiment.

First, a configuration of the editing terminal apparatus 30 associated with the first embodiment of the invention will be described with reference to FIG. 13. FIG. 13 is a block diagram illustrating an approximate configuration of the editing terminal apparatus 30 associated with the first embodiment of the invention.

As shown in FIG. 13, the editing terminal apparatus 30 has a CPU 302, a memory block 304, an input block 306, a display block 308, an audio output block 310, a communication block 312, an external interface 314, a disk unit 316, a recording unit 318, a conversion table database 320, a metadata input/output processing block 330, and a metadata application processing block 380.

The CPU 302 functions as a calculation processing unit and a control unit, thereby controlling the processing of the components of the editing terminal apparatus 30. The memory block 304, based on a RAM, ROM, or a flash memory, stores various data associated with the processing by the CPU 302 and operation programs thereof, for example.

The input block 306 is made up of a general input unit such as mouse, keyboard, and touch panel (each not shown) and a video editing input unit (not shown), for example. The video editing input unit has an In-point enter button for entering the In-point, an Out-point enter button for entering the Out-point, a video reproduction button, a stop button, and other edit buttons, and a jog dial and a lever for controlling video reproduction speed and selecting video data to be reproduced, for example. The editing department personnel is able to operate the above-mentioned video editing input unit, thereby reproducing video data in various manners (fast forward, rewind, and so on) and entering In-point and Out-point.

The display block 308 is a display device based on a CRT monitor or LCD monitor for example. The display block 308 is capable of displaying metadata and video data.

The audio output block 310 is made up of a sounding device such as a speaker and an audio data processing unit, thereby outputting the sound of video data, for example. The audio output block 310 is also capable of audibly outputting metadata such as production information for example read aloud by the metadata application processing block 380 to be described later.

The communication block 312 is capable of transmitting and receiving various kinds of metadata and various kinds of data such as low-resolution video data for example with external devices such as the planning terminal apparatus 10 and the imaging apparatus 40 for example via the network 5. For example, the communication block 312 receives the metadata provided by an external device and outputs the received metadata to the metadata input/output processing block 330. Also, the communication block 312 is capable of executing encoding such as KLV encoding if the above-mentioned data is transmitted by SDI via the network 5 for example. As described above, the metadata and resolution video data for example received by the communication block 312 are recorded to the memory block 304 or the recording unit 318 for example.

The external interface 314 supports the transmission and reception of data with peripheral devices connected to the editing terminal apparatus 30 by the USB or SCSI standard for example. These peripheral devices include externally connected disk units, hard disk drives, printers, and scanners for example.

The disk unit 316 is a recording/reproducing apparatus for recording and reproducing video data (or video signals) with recording media such as the optical disk 3 provided by the imaging apparatus 40. The disk unit 316 may be configured as incorporated in the editing terminal apparatus 30 or as externally connected to via the external interface 314 to provide a recording/reproducing apparatus separate from the editing terminal apparatus 30, for example. In the latter case, the above-mentioned CPU, memory block, editing input unit, communication block, computer interface, and display control block may be arranged on the disk unit 316.

The disk unit 316 such as above is capable of reproducing original video or low-resolution video data recorded to the optical disk 3 for example, thereby displaying the reproduced data onto the display block 308. Also, the disk unit 316 is capable of reading metadata from the optical disk 3 for example to output the read metadata to the metadata input/output processing block 430.

The disk unit 316 is also capable of storing video data to the optical disk 3 for example. For example, the disk unit 316 is capable of recording the low-resolution video data received via the network 5 and the video data extracted by editing processing to the optical disk 3. In addition, the disk unit 316 is capable of recording generated and edited metadata to the optical disk 3, for example.

Further, the disk unit 316 may be configured so as to access not only the optical disk 3 but also magnetic disks such as flexible disk, hard disk, and MO and recording media such as memory stick and memory card for example to read/write metadata and various application programs. Consequently, the editing terminal apparatus 30 becomes able to get metadata from a memory card for example.

The recording unit 318 is a storage unit based on a hard disk drive for example, storing various programs, metadata, and video data such as original and low-resolution video data, for example.

The conversion table database 320 is a feature block of the first embodiment of the invention and a recording unit for storing the above-mentioned metadata conversion table for example. The functional configuration of the conversion table database 320 is substantially the same as the functional configuration of the above-mentioned conversion table database 420 of the imaging apparatus 40, so that the functional configuration of the conversion table database 320 will be omitted. It should be noted that the conversion table database 320 such as above may be arranged in the above-mentioned recording unit 318.

The metadata input/output processing block 330 is a feature block of the first embodiment of the invention and, as described with reference to FIG. 7, has a capability of converting external metadata into internal metadata and outputting the resultant internal metadata to the metadata application processing block 380.

The metadata input/output processing block 430 has a metadata notation format identification block 332, a conversion table selection block 334, and a metadata notation format conversion block 336, for example. The functional configurations of these metadata notation format identification block 332, conversion table selection block 334, and metadata notation format conversion block 336 are substantially the same as those of the above-mentioned metadata notation format identification block 432, conversion table selection block 434, and metadata notation format conversion block 436 of the imaging apparatus 40, so that the description thereof will be omitted.

The metadata application processing block 380 has a capability of controlling various processing operations such as the processing associated with video signals in the editing terminal apparatus 30 on the basis of the metadata of which notation format has been converted by the metadata input/output processing block 330, for example. In this point of view, metadata application processing block 380 functions as the control processing block associated with the first embodiment of the invention.

The metadata notation format conversion block 336 is capable of converting an external metadata notation format that cannot be handled by the metadata application processing block 380 into a notation format compatible with the metadata application processing block 380, for example. The metadata application processing block 380 is capable of interpreting the converted metadata file and extracting necessary metadata therefrom, for example. Further, by use of the extracted metadata, the metadata application processing block 380 is capable of executing various application processing operations to be executed in the editing terminal apparatus 30.

The following describes a specific example of metadata-based control processing to be executed by the metadata application processing block 380.

First, metadata display control processing and audio conversion/reproduction processing to be executed by the metadata application processing block 380 will be described. The metadata application processing block 380 is capable of executing display control processing for displaying the interpreted metadata onto the display block 308. Further, the metadata application processing block 380 is capable of executing control so as to interpret metadata such as program metadata and take metadata, convert the interpreted metadata into an audio signal, and audibly output the contents of the metadata from the audio output block 310. It should be noted that the metadata display control processing and audio conversion/reproduction processing are substantially the same as the metadata display control processing and audio conversion/reproduction processing by the metadata application processing block 480, so that the detail description thereof will be omitted.

The above-mentioned metadata display control processing and audio conversion/reproduction processing allow the editing department personnel for example to browse the program metadata arranged in the form of a table and listen to a read-aloud production instruction and a material gathering situation, thereby understanding the scenario of a video program to be edited and a situation at the time of shooting for example. Also, the above-mentioned processing operations allow the editing department personnel to browse the take metadata displayed in a list or individually and listen to the contents of read-aloud take metadata, thereby understanding the outline of the video data corresponding to the take metadata and a shooting condition at the time of shooting, for example.

The following describes video data display control processing to be executed by the metadata application processing block 380. The metadata application processing block 380 is capable of executing video display control processing for displaying video data onto the display block 308 in a variety of manners on the basis of interpreted metadata.

To be more specific, the metadata application processing block 380 is capable of controlling so as to sequentially and continuously reproduce (or continuously display) video data of OK take in the order of scenarios on the basis of program metadata, for example. The following details this continuous reproduction processing. First, the metadata application processing block 380 gets the knowledge of the cut scenario sequence on the basis of the production instruction information of program metadata, for example. Further, on the basis of take relating information, the metadata application processing block 380 controls the disk unit 316 so as to sequentially reproduce the video data of OK take subordinate to the cut, while sequentially identifying the video data of this OK take in the order of scenarios. This processing allows the continuous reproduction of video data in the order of scenarios, thereby providing the preview of a video program.

In addition, the metadata application processing block 380 is capable of executing control so as to reproduce (or display) only the video data of one take selected by the editing department personnel for example, separately from other video data, for example. The following details this single-reproduction processing. First, the metadata application processing block 380 displays program metadata onto the display block 308. Next, when a take to be browsed is selected by the editing department personnel from among a plurality of takes contained in the program metadata (through touch screen or GUI, for example), the metadata application processing block 380 identifies the video data of that take on the basis of the take relating information, thereby controlling the disk unit 316 to reproduce only that video data. Consequently, the disk unit 316 becomes able to reproduce the video data of only the specified take.

Further, the metadata application processing block 380 is also capable of displaying part or all of program metadata or take metadata for example as superimposed on the video during the above-mentioned reproduction of video data.

Thus, the metadata application processing block 380 is capable of displaying video data in a variety of manners on the basis of metadata. Consequently, before video editing, the editing department personnel is able to quickly browse desired video data in a desired manner. Further, by browsing the video data continuously reproduced in the sequence of scenarios, the editing department personnel is able to understand the overall configuration and an image of each video program to be edited. This significantly enhances the efficiency of editing processing. After editing processing, the editing department personnel can easily check the contents of a finished video program by browsing the continuously reproduced video data.

In addition, the metadata application processing block 380 is capable of executing the thumbnail display control processing of video data in the manner as the metadata application processing block 480 of the imaging apparatus 40. This video data thumbnail display control processing allows the provision of the visual index information of video data to the editing department personnel for example.

The following describes preliminary edit support processing to be executed by the metadata application processing block 380. For example, the metadata application processing block 380 is capable of generating the above-mentioned in-point and out-point on the basis of a result of preliminary editing by the editing department personnel and additionally entering the generated in-point and out-point into program metadata, thereby supporting preliminary editing.

To be more specific, the preliminary processing is the extraction of video data for a duration of time equivalent to a cut from the video data of take. In order to execute this preliminary editing processing, the editing department personnel must first reproduce the video data of a take related with a cut to be preliminarily edited and browse the reproduced video data, for example. It should be noted that this reproduction of video data is suitably executed by the above-mentioned video display control processing, thereby allowing the editing department personnel to quickly and easily execute the preliminary editing. Next, while browsing the reproduced video, the editing department personnel presses the above-mentioned in-point enter button or out-point enter button at a desired point of time, thereby entering the in-point and the out-point. The metadata application processing block 380 extracts the time codes attached to the video data concerned for example at points of time the in-point enter button and the out-point enter button were pressed by the editing department personnel, for example. Consequently, the metadata application processing block 380 becomes able to generate in-point information and out-point information. Further, the metadata application processing block 380 enters the input-point information and out-point information thus generated into above-mentioned predetermined items of the program metadata, for example. Consequently, the program metadata is completed, allowing the identification of a valid range of the video data of the take associated with each cut, for example.

The following describes the video data editing processing to be executed by the metadata application processing block 380. On the basis of the above-mentioned completed program metadata for example, the metadata application processing block 380 extracts the video data of takes corresponding to all cuts making up a video program and combines the plural pieces of extracted video data, recording the resultant combined video data, for example.

To be more specific, first, on the basis of the interpreted production instruction information, the metadata application processing block 380 identifies the first cut of a scenario for example. Further, on the basis of the take relating information of program metadata for example, the video data editing block 340 identifies the "OK" take corresponding to the cut concerned and get the in-point information and out-point information of the video data of the take concerned. Next, the metadata application processing block 380 gets the video data of the take concerned by use of the disk unit 316 and, on the basis of the above-mentioned in-point information and out-point information, extracts the effective video part of the video data concerned. Further, the metadata application processing block 380 controls the disk unit 316 for example so as to record the extracted video data to a new optical disk 3 or the recording unit 318, for example. Next, the metadata application processing block 380 extracts the video data of a take corresponding to a next cut in the same manner as above and executes control so as to record the extracted video data to a position immediately after, for example, the video data of the above-mentioned take. Repeating the above-mentioned processing, the metadata application processing block 380 is capable of controlling the processing of combining the necessary video data in the order of scenarios and recording the combined video data. The video data editing processing such as above allows the completion of the video data of each video program in accordance with scenarios.

Thus, a specific example of the application processing based on metadata to be executed by the metadata application processing block 380 has been described. However this example is illustrative only and therefore the metadata application processing block 380 is capable of executing control on various processing operations in the editing terminal apparatus 30 on the basis of metadata, such as various processing operations associated with video signals.

5.2 Processing Method of the Editing Terminal Apparatus

The following describes a processing method associated with metadata in the editing terminal apparatus 30 associate with the first embodiment of the invention. If the metadata application processing block 380 has acquired external metadata that cannot be recognized by the editing terminal apparatus 30 associated with the first embodiment of the invention, the metadata notation format identification block 332 recognizes the notation format of the acquired external metadata. Next, the conversion table selection block 334 selects a conversion table corresponding to the identified notation format. Further, on the basis of the selected conversion table, the metadata notation format conversion block 336 converts the notation format of the external metadata into the notation format of internal metadata. As a result, the metadata application processing block 380 becomes able to control various processing operations to be executed in the editing terminal apparatus 30 on the basis of the metadata that has been converted and become recognizable. It should be noted that the processing method associated with the metadata conversion of the editing terminal apparatus is substantially the same as the above-mentioned processing method of the imaging apparatus 40, so that the description of the processing method of the editing terminal apparatus will be omitted.

As described above, the imaging apparatus 40 and the editing terminal apparatus 30 have the metadata input/output processing blocks 430 and 330, so that, if metadata having a notation format that is incompatible with the metadata application processing blocks 480 and 380, the imaging apparatus 40 and the editing terminal apparatus 30 are capable of converting the incompatible notation format into a compatible notation format, thereby making the metadata recognizable. Therefore, the imaging apparatus 40 and the editing terminal apparatus 30 are capable of flexibly handle the XML-based metadata of any type.

Also, the above-mentioned metadata input/output processing block is applicable to other terminal apparatuses such as the planning terminal apparatus 10 and the field PC 50, for example. Consequently, if metadata formats compatible with terminal apparatuses are different from each other inside the video program production support system 1, the terminal apparatuses are capable of smoothly transfer data with each other, thereby enhancing the efficiency of video program production and the quality of video works.

Second Embodiment

The following describes the second embodiment of the invention. The second invention is characterized by that an imaging apparatus 40 that is one embodiment of a video signal recording apparatus converts the notation format of metadata generated by the imaging apparatus 40 into the notation format compatible with an editing terminal apparatus 30 that is one embodiment of a video signal reproduction apparatus and relates the converted metadata with a video signal, providing the related metadata and video signal to the editing terminal apparatus 30. Namely, in consideration of the editing terminal apparatus 30 that uses video signals and metadata, the imaging apparatus 40 that provides these video signals and metadata converts the notation format of the metadata into the notation format that can be handled by the editing terminal apparatus 30 before providing the video signals and metadata.

The imaging apparatus 40 and the editing terminal apparatus 30 associated with the second embodiment of the invention are different from the imaging apparatus 40 and the editing terminal apparatus 30 associated with the first embodiment of the invention only in the functional configuration associated with the above-mentioned feature point. Therefore, the functional configuration, system configuration, metadata and so on other than the above associated with the imaging apparatus 40 and the editing terminal apparatus 30 of the second embodiment are substantially the same as those of the first embodiment, so that the description of these other configurations and metadata will be omitted.

Figure 14:
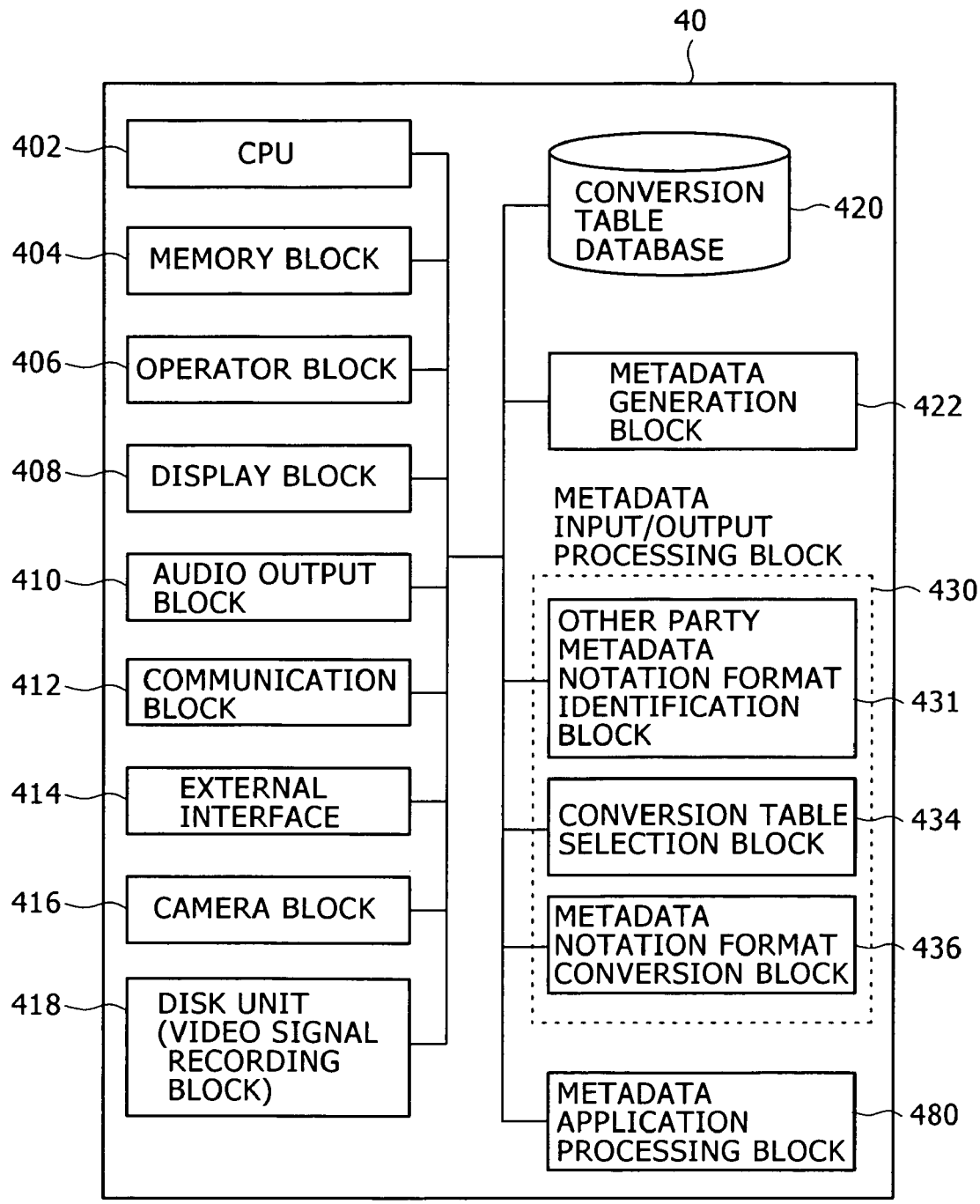
FIG. 14 is a block diagram illustrating an approximate configuration of an imaging apparatus practiced as a second embodiment of the invention.

First, with reference to FIG. 14, a configuration of the imaging apparatus 40 associated with the second embodiment will be described. FIG. 14 is a block diagram illustrating an approximate configuration of the imaging apparatus 40 associated with the second embodiment.

As shown in FIG. 14, the imaging apparatus 40 has a CPU 402, a memory block 404, an operator block 406, a display block 408, an audio output block 410, a communication block 412, an external interface 414, a camera block 416, a disk unit 418, a conversion table database 420, a metadata generation block 422, a metadata input/output processing block 430, and a metadata application processing block 480.

It should be noted that the functional configurations of other component blocks of the imaging apparatus 40 associated with the second embodiment than the metadata input/output processing block 430 are substantially the same as those of the imaging apparatus 40 associated with the first embodiment, so that the description of these other component blocks will be omitted.

The metadata input/output processing block 430 is a feature block associated with the second embodiment and, as described with reference to FIG. 7, has a capability of converting internal metadata into given external metadata and outputting the resultant external metadata, for example. The metadata input/output processing block 430 has an other party metadata notation format identification block 431, a conversion table selection block 434, and a metadata notation format conversion block 436.

The other party metadata notation format identification block 431 has a capability of identifying the notation format of metadata that the other party's device (the editing terminal apparatus 30 for example) to which metadata is provided (hereafter also referred to as other party metadata format). To be more specific, upon reception of an instruction for providing internal metadata to an external device by the personnel through an input operation for example, the other party metadata notation format identification block 431 identifies the other party metadata format of that external device and outputs the information about the other party metadata format to the conversion table selection block 434.

The identification of other party metadata format by the other party metadata notation format identification block 431 may be executed through identification on the basis of the input done by the personnel or through automatic identification on the basis of the information about other party device identification, for example. In the automatic identification, the other party metadata notation format identification block 431 may access the other party device to automatically get the information about the other party metadata format. Alternatively, the other party metadata notation format identification block 431 may read the information about the other party metadata format stored in the memory block 304 provided inside the imaging apparatus 40 or in an externally provided recording medium such as memory card to automatically get the information about the other party metadata format. In this case, it is required to record a plurality of other party metadata formats for example obtained beforehand to the memory block 304 or a recording medium by the personnel for example.

The conversion table selection block 434 has a capability of selecting a conversion table corresponding to the metadata notation format compatible with an other party device such as the editing terminal apparatus 30 from among a plurality of conversion tables for example recorded to the conversion table database 420, for example. Namely, the conversion table selection block 434 is capable of selecting a conversion table for converting the notation format of internal metadata into the other party metadata format. This conversion table selection processing is executed on the basis of the information about the other party metadata format inputted from the other party metadata notation format identification block 431, for example. If the other party metadata format determined by the other party metadata notation format identification block 431 is the MOS metadata format for example, the conversion table selection block 434 selects a conversion table corresponding to both internal metadata and MOS metadata, for example.

The metadata notation format conversion block 436 has a capability of converting the notation format of internal metadata into the other party metadata format on the basis of the conversion table selected by the conversion table selection block 434. As described above, the metadata notation format conversion block 436 is made up of a conversion engine such as the XSLT engine, for example. In accordance with the selected conversion table, the metadata notation format conversion block 436 is capable of converting the notation format of internal metadata generated by the metadata generation block 422 or the notation format of internal metadata edited by the metadata application processing block 480 into the other party metadata format, for example. This metadata conversion processing is the tag conversion processing for example described above with reference to FIGS. 9 through 11.

As described above, the metadata notation format conversion block 436 is capable of converting the internal metadata incompatible with an other party device into the other party metadata format compatible with the other party device, for example. The metadata thus converted is recorded by the disk unit 418 to a recording medium such as the optical disk 3, for example. In recording the metadata, the disk unit 418 associated with the second embodiment of the invention is capable of recording the metadata concerned and the video data corresponding thereto in a related manner. Techniques of relating metadata with video data and recording the resultant related metadata and video data include on in which a directory configuration in a recording medium is used such as recording a metadata file and a video data file in a same folder or linked folders, for example, or another in which, as with the program metadata take relating information, a video data file name is entered in metadata, for example.

Thus, the recording medium such as the optical disk 3 to which the converted metadata is recorded is provided to an external device such as the editing terminal apparatus 30. Consequently, the editing terminal apparatus 30 for example becomes able to get video data and the metadata related thereto through a same recording medium, for example.

Thus, the functional configuration of the component blocks of the imaging apparatus 40 have been described. However, the configuration of the imaging apparatus 40 is not restricted to the above-mentioned exemplary functional configuration.

For example, by transmitting the metadata converted into the above-mentioned other party metadata format via the network 5, the imaging apparatus 40 may provide the converted metadata to an external device such as the editing terminal apparatus 30, for example. Consequently, the imaging apparatus 40 becomes able to quickly provide the converted metadata to that external device, for example.

Further, so as to convert the externally provided external metadata having an incompatible notation format into the internal metadata, the metadata input/output processing block 430 associated with the second embodiment of the invention may also have the capability of the metadata input/output processing block 430 associated with the first embodiment of the invention.

Namely, the metadata input/output processing block 430 may be configured to have also the metadata notation format identification block 432 for identifying the notation format of external metadata. In addition, as with the case of the first embodiment for example, the conversion table selection block 434 may have the capability of selecting a conversion table corresponding to the notation format of external metadata identified by the metadata notation format identification block 432 from among a plurality of conversion tables for example stored in the conversion table database 420, for example. Moreover, as with the case of the first embodiment, the metadata notation format conversion block 436 may also have the capability of converting the notation format of external metadata into the notation format of internal metadata compatible with the metadata application processing block 80, for example. These novel configurations allow the conversion of the notation format of external metadata incompatible with the imaging apparatus 40 into the notation format of internal metadata, thereby letting the metadata application processing block 480 recognize and process the converted, compatible metadata.

Figure 15:
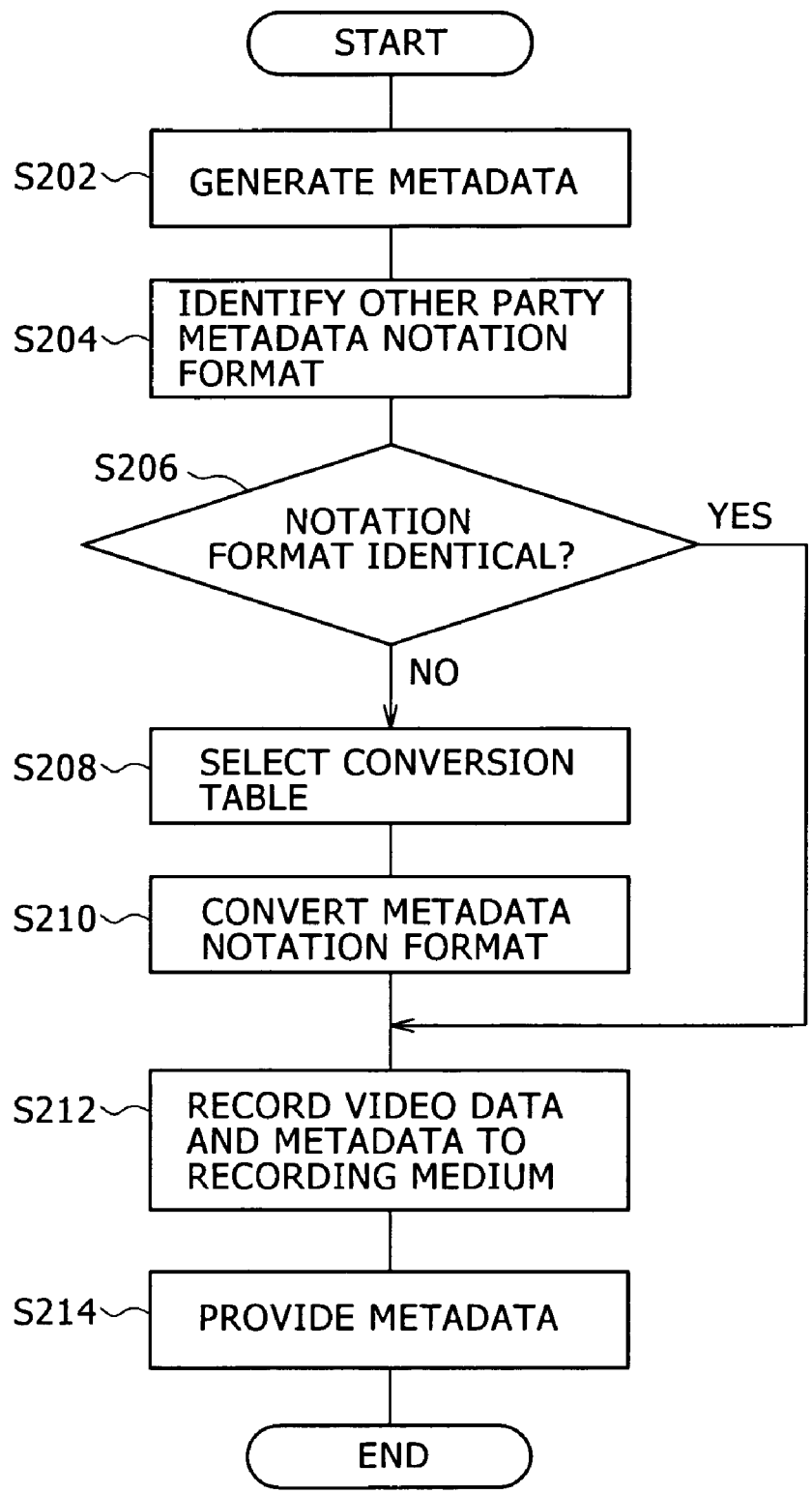
FIG. 15 is a flowchart indicative of a processing method for an imaging apparatus practiced as the second embodiment.

The following describes the processing method for processing metadata in the imaging apparatus 40 associated with the second embodiment of the invention, with reference to FIG. 15. FIG. 15 is a flowchart indicative of the processing method of the imaging apparatus 40 associated with the second embodiment.

As shown in FIG. 15, in step S202, metadata is generated in the imaging apparatus 40 (steps S202; metadata generating process). The metadata generation block 422 of the imaging apparatus 40 newly generates metadata such as the above-mentioned take metadata, for example. The metadata generated in the imaging apparatus 40 is written in the internal metadata notation format compatible with the imaging apparatus 40.

It should be noted that the metadata generated in the imaging apparatus 40 includes not only the above-mentioned newly generated metadata but also the metadata externally provided and edited in the imaging apparatus 40. An example of the edited metadata is program metadata for example edited by additionally entering the above-mentioned take relating information for example by the metadata application processing block 480, for example.

Next, in step S204, the notation format of metadata that is recognizable by the other party's external device to which the metadata is provided is identified (step S204). The other party metadata notation format identification block 431 identifies the above-mentioned other party metadata format on the basis of the input done by the personnel or automatically, for example.

In step S206, it is determined whether or not the identified other party metadata notation format is the same of the notation format of internal metadata in the imaging apparatus 40 (step S206). The other party metadata notation format identification block 431 determines whether or not the known internal metadata notation format is the same as the other party metadata format identified in step S204. If a mismatch is found, then the procedure goes to step S208; if a match is found, the procedure goes to step S212 because there is no need for metadata conversion.

Then, in step S208, the conversion table corresponding to the identified metadata notation format is selected (step S208). The conversion table selection block 434 selects, for example, one conversion table corresponding to the other party metadata notation format identified in step S204 and the internal metadata notation format, from a plurality of conversion tables recorded in the conversion table DB 420.

Next, in step S210, the notation format of the metadata generated as described above is converted on the basis of the above-mentioned selected conversion table (step S210; metadata notation format conversion process). On the basis of the conversion table selected in step S208, the metadata notation format conversion block 436 converts the internal metadata notation format into the other party metadata format. Consequently, the imaging apparatus 40 becomes able to convert the internal metadata notation format into the notation format that is recognizable by the editing terminal apparatus 30 for example.

In step S212, the above-mentioned converted metadata and a video signal are recorded to a recording medium (step S212; video signal recording process). In order for the editing terminal apparatus 30 for example to control the processing associated with the video signal on the basis of the above-mentioned metadata, the disk unit 418 relates the metadata converted in step S210 (or the metadata determined to be unnecessary for conversion in step S206) with the video data corresponding thereto and records the related metadata and video data to the optical disk 3 for example.

Then, in step S214, the metadata and so on are provided via the recording medium (step S214). The imaging apparatus 40 provides the recording medium such as the optical disk 3 for example recorded with the metadata and the video data to an external device such as the editing terminal apparatus 30. Consequently, the editing terminal apparatus 30 for example becomes able to get the metadata converted so as to be compatible with the editing terminal apparatus 30 along with the video data.

Thus, the imaging apparatus 40 is capable of converting the notation format of the metadata generated and edited by itself into the other party notation format compatible with the editing terminal apparatus 30 for example and recording the converted metadata to a recording medium. Consequently, receiving this recording medium, the editing terminal apparatus 30 for example becomes able to read the converted metadata from the recording medium to recognize and process the metadata without executing a special processing operation. This novel configuration allows the editing terminal apparatus 30 that is the receiving side of metadata to have no metadata input/output processing block 330 as described with reference to the first embodiment of the invention, resulting in a simplified device configuration and an accordingly reduced cost.

In addition, because video data and metadata are recorded to a recording medium as related with each other, the editing terminal apparatus 30 for example is capable of easily understanding the relationship between the acquired metadata and video data. Consequently, the editing terminal apparatus 30 is capable of suitably executing the processing associated with that video data on the basis of that metadata.

Third Embodiment

The following describes a third embodiment of the invention. The third embodiment of the invention is characterized in that an imaging apparatus 40 that is one embodiment of a video signal recording apparatus relates the metadata generated by itself with a conversion table and a video signal corresponding to that metadata and provides these metadata, conversion table, and video signals to an editing terminal apparatus 30 that is one embodiment of a video signal reproduction apparatus. Namely, in consideration of the editing terminal apparatus 30 that uses video signals and metadata, the imaging apparatus 40 that provides these video signals and metadata provides the conversion table corresponding to that metadata to the editing terminal apparatus 30 along with that metadata so as to allow the editing terminal apparatus 30 to easily convert that metadata for use.

The imaging apparatus 40 and the editing terminal apparatus 30 associated with the third embodiment of the invention are different from the imaging apparatus 40 and the editing terminal apparatus 30 associated with the first embodiment of the invention only in the functional configuration associated with the above-mentioned feature point. Therefore, the functional configurations other than that shown above, the system configuration, and the metadata associated with the imaging apparatus 40 and the editing terminal apparatus 30 of the third embodiment are substantially the same as those of the first embodiment, so that the description of these other configurations and metadata will be omitted.

Figure 16:
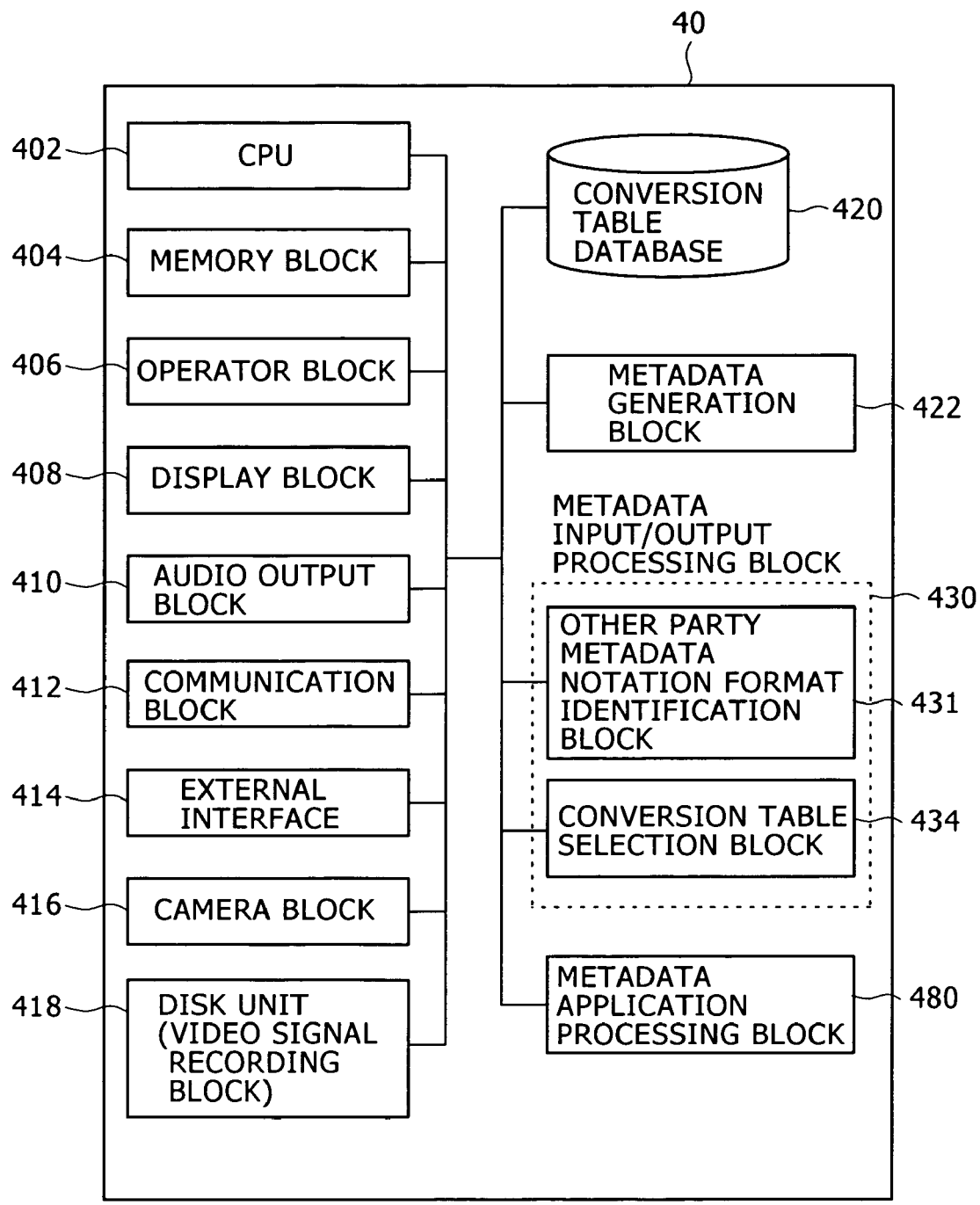
FIG. 16 is a block diagram illustrating an approximate configuration of an imaging apparatus practiced as a third embodiment of the invention.

First, with reference to FIG. 16, a configuration of the imaging apparatus 40 associated with the third embodiment of the invention will be described. FIG. 16 is a block diagram illustrating an approximate configuration of the imaging apparatus 40 associated with the third embodiment.

As shown in FIG. 16, the imaging apparatus 40 has a CPU 402, a memory block 404, an operator block 406, a display block 408, an audio output block 410, a communication block 412, an external interface 414, a camera block 416, a disk unit 418, a conversion table database 420, a metadata generation block 422, a metadata input/output processing block 430, and a metadata application processing block 480.

It should be noted that the functional configurations of other component blocks of the imaging apparatus 40 associated with the third embodiment than the metadata input/output processing block 430 are substantially the same as those of the imaging apparatus 40 associated with the first embodiment, so that the description of these other component blocks will be omitted.

The metadata input/output processing block 430 is a feature block associated with the third embodiment and has a capability of selecting and outputting a conversion table necessary for the conversion of internal metadata, for example. The metadata input/output processing block 430 has an other party metadata notation format identification block 431 and a conversion table selection block 434, for example.

The other party metadata notation format identification block 431 has a capability of identifying the notation format of metadata that can be handled by the other party's device (the editing terminal apparatus 30 for example) to which metadata is provided (hereafter also referred to as other party metadata format). The functional configuration of the other party metadata notation format identification block 431 is substantially the same as that of the other party metadata notation format identification block 431 associated with the second embodiment, so that the description thereof will be omitted. It should be noted that the other party metadata notation format identification block 431 such as above may not be arranged, for example.

The conversion table selection block 434 has a capability of selecting a conversion table corresponding to the metadata notation format compatible with an other party device such as the editing terminal apparatus 30 from among a plurality of conversion tables for example recorded to the conversion table database 420, for example. Namely, the conversion table selection block 434 is capable of selecting a conversion table for a device of other party to convert the notation format of internal metadata generated by the imaging apparatus 40 into the other party metadata format, for example. The conversion table selection processing such as above may be executed on the basis of the information about the other party metadata format entered from the other party metadata notation format identification block 431, for example. For example, if the other party metadata format identified by the other party metadata notation format identification block 431 is the MOS metadata format, the conversion table selection block 434 selects the conversion table corresponding to both internal metadata and MOS metadata for example.

If the metadata input/output processing block 430 has no other party metadata notation format identification block 431, then the conversion table selection block 434 may select one or more conversion tables corresponding to the internal metadata generated by the imaging apparatus 40 and the external metadata having any given notation format. In this case, the conversion table selection block 434 may also select all conversion tables for example stored in the conversion table database 420 for example so as to be compatible as many types of external metadata as possible.

One or more conversion tables selected by the conversion table selection block 434 as described above are recorded to a recording medium such as the optical disk 3 by the disk unit 418. At the time of recording these conversion tables, the disk unit 418 configured as the video signal recording block associated with the third embodiment is capable of relating these conversion tables with the unconverted metadata generated by the metadata generation block 422 for example and the video data corresponding to that metadata, thereby recording the resultant related conversion tables, metadata, and video data to the recording medium. Techniques for relating and recording metadata and video data include one in which a directory configuration in the recording medium is used such that a conversion table file, a metadata file, and a video data file are recorded to a same folder or linked folders, another one in which a conversion table name and a video data file name are entered in metadata, and still another one in which a data file containing the information about the relation of these three files is recorded along with these files.

As described above, the recording medium such as the optical disk 3 recorded with unconverted metadata and a conversion table is provided to an external device such as the editing terminal apparatus 30. Consequently, the editing terminal apparatus 30 for example becomes able to get video data and the metadata associated with this video data and a conversion table for converting this metadata via the same recording medium, for example.

Thus the functional configurations of the component blocks of the imaging apparatus 40 have been described. However, the imaging apparatus 40 is not restricted to the above-mentioned exemplary configuration.

For example, by transmitting the above-mentioned unconverted metadata and conversion table corresponding thereto via the network 5, the imaging apparatus 40 may provide these metadata and conversion table to an external device such as the editing terminal apparatus 30. Consequently, the imaging apparatus 40 becomes able to quickly provide metadata and conversion tables to an external device concerned.

The metadata input/output processing block 430 associated with the third embodiment of the invention may also have the same function as the metadata input/output processing block 430 associated with the first embodiment so as to convert the externally inputted external metadata having an incompatible notation format into the internal metadata having a compatible notation format, for example. Namely, the metadata input/output processing block 430 may additionally have the above-mentioned metadata notation format identification block 432 and metadata notation format conversion block 436. This novel configuration allows the conversion of external metadata incompatible with the imaging apparatus 40 into the internal metadata compatible therewith, thereby letting the metadata application processing block 480 recognize and process the converted metadata.

Figure 17:
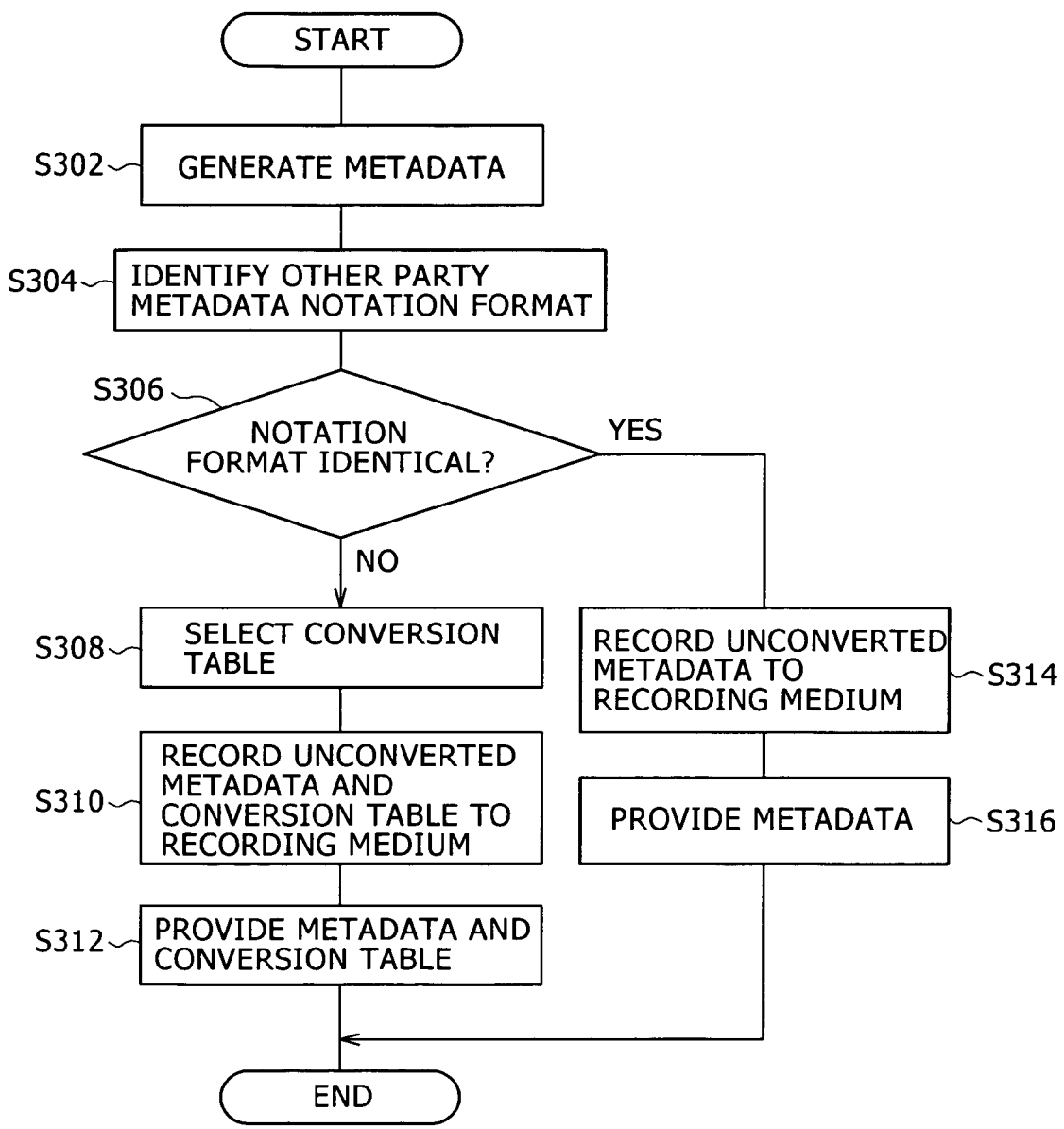
FIG. 17 is a flowchart indicative of a processing method for the imaging apparatus practiced as the third embodiment.

The following describes a processing method associated with metadata to be executed in the imaging apparatus 40 associated with the third embodiment of the invention, with reference to FIG. 17. FIG. 17 is a flowchart indicative of the processing method of the imaging apparatus 40 associated with the third embodiment.

As shown in FIG. 17, first, in step S302, metadata is generated inside the imaging apparatus 40 (step S302; metadata generating process). Because this step is the same as step S202 described with reference to FIG. 15, details thereof will be omitted.

Next, in step S304, the notation format of metadata recognizable by the external device of other party to which the metadata is provided is identified (step S304). The other party metadata notation format identification block 431 identifies the other party metadata format on the basis of the input done by the personnel or automatically, for example. It should be noted that this step may be skipped; in this case, subsequent steps S306, S312, and S314 will also be skipped.

Further, in step S306, it is determined whether the identified other party metadata format is the same as the notation format of the internal metadata of the imaging apparatus 40 (step S306). The other party metadata notation format identification block 431 determines whether the known notation format of internal metadata is the same as the other party metadata format identified in step S304. If a mismatch is found, the procedure goes to step S308. If a match is found, the procedure goes to step S314 because there is no need for transmitting the conversion table.

Then, in step S308, one or more conversion tables are selected (step S308; conversion table selection process). The conversion table selection block 434 selects one conversion table for example corresponding to both the other party metadata format identified in step S304 and the notation format of the internal metadata from among a plurality of conversion tables recorded to the conversion table database 420, for example.

If step S304 is skipped or the other party metadata format cannot be identified, the conversion table selection block 434 may select all or a part of a plurality of conversion tables recorded to the conversion table database 420, for example.

Next, in step S310, the selected conversion table, the generated metadata, and the video signal are recorded to a recording medium (step S310). For the editing terminal apparatus 30 for example to be able to control the processing associated with the video signal on the basis of the above-mentioned metadata, the disk unit 418 relates one or more conversion tables selected in step S308 with the unconverted metadata generated in step S302 and the video data corresponding to that metadata and records the these related conversion tables and data to the optical disk 3 for example.

In step S312, the conversion table and the metadata are provided via the recording medium (step S312). The imaging apparatus 40 provides the recording medium such as the optical disk 3 storing the conversion tables, the metadata, and the video data recorded in step S310 to an external device such as the editing terminal apparatus 30. Consequently, the editing terminal apparatus 30 becomes able to get the unconverted metadata and the conversion table for converting this metadata, along with the video data, for example.

On the other hand, in step S314, the above-mentioned generated metadata and the above-mentioned video signal are recorded to a recording medium (step S314). The disk unit 418 relates unconverted metadata generated in step S302 with the video data corresponding to the metadata and records these related metadata and video data to the optical disk 3 for example.

Then, in step S316, the metadata and so on are provided via the recording medium (step S316). The imaging apparatus 40 provides the recording medium such as the optical disk 3 recorded storing the metadata and the video data recorded in step S308 to the external device such as the editing terminal apparatus 30. Consequently, the editing terminal apparatus 30 for example becomes able to get the unconverted but compatible metadata along with the video data, for example.

Figure 18:
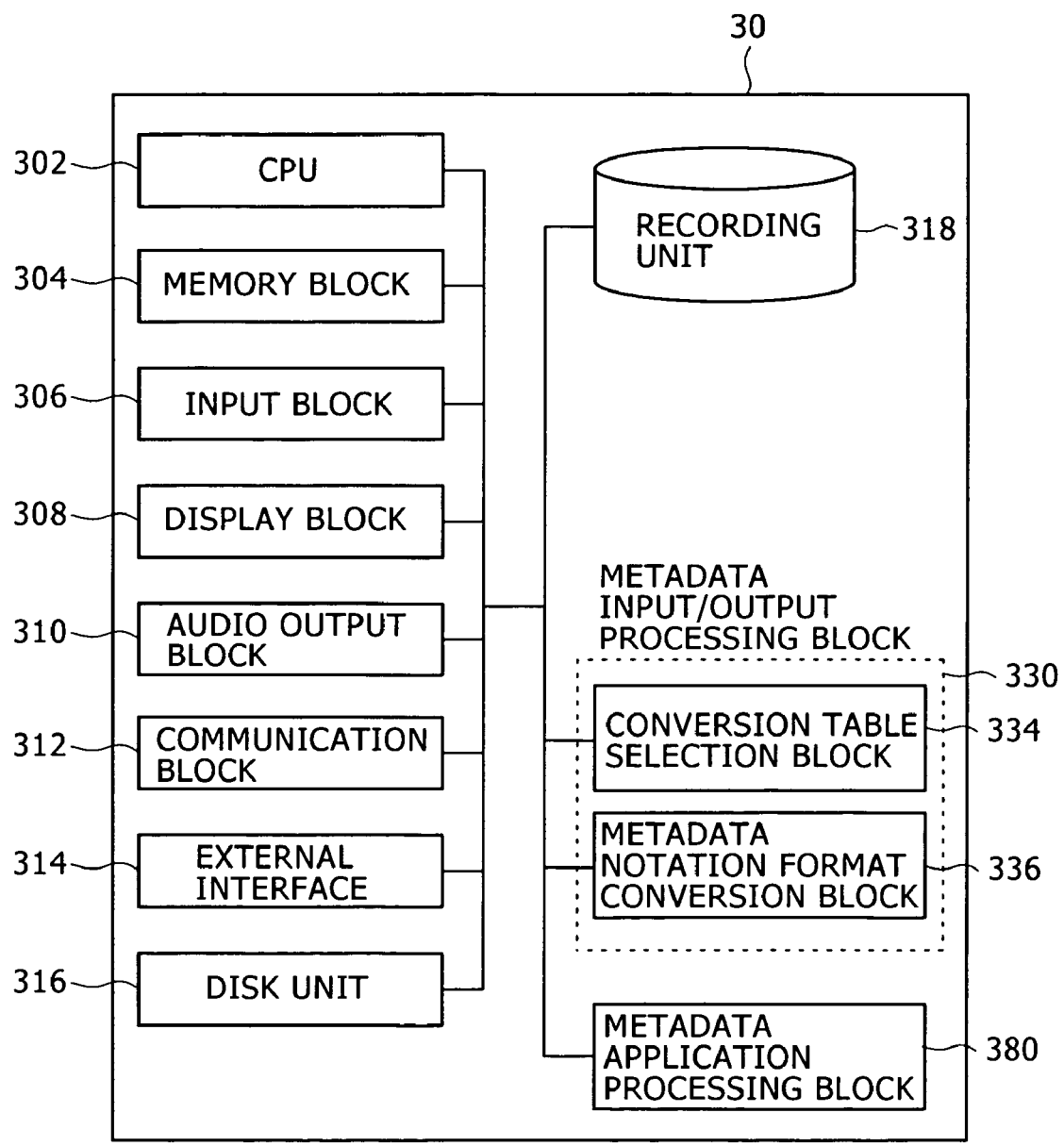
FIG. 18 is a block diagram illustrating an approximate configuration of an editing terminal apparatus practiced as the third embodiment.

The following describes a configuration of the editing terminal apparatus 30 associated with the third embodiment of the invention with reference to FIG. 18. FIG. 18 is a block diagram illustrating an approximate configuration of the editing terminal apparatus 30 associated with the third embodiment.

As shown in FIG. 18, the editing terminal apparatus 30 has a CPU 302, a memory block 304, an input block 306, a display block 308, an audio output block 310, a communication block 312, an external interface 314, a disk unit 316, a recording unit 318, a conversion table database 320, a metadata input/output processing block 330, and a metadata application processing block 380.

It should be noted that the functional configurations of other component blocks of the editing terminal apparatus 30 associated with the third embodiment than the disk unit 316 and the metadata input/output processing block 330 are substantially the same as those of the editing terminal apparatus 30 associated with the first embodiment, so that the description of these other component blocks will be omitted.

In addition to the function of the disk unit 316 associated with the above-mentioned first embodiment, the disk unit 316 functions as a metadata reading block for reading metadata and one or more conversion tables corresponding to the metadata notation format from a recording medium provided from the imaging apparatus 40, for example.

To be more specific, when a recording medium such as the optical disk 3 is provided from the imaging apparatus 40 for example to the editing terminal apparatus 30, the disk unit 418 reads unconverted metadata (namely the metadata having a notation format compatible with the imaging apparatus 40 for example) and one or more conversion tables corresponding to the metadata from that recording medium, for example. The metadata recorded to that recording medium is based on XML but is written in a notation format recognizable by the imaging apparatus 40, so that it has not always a notation format corresponding to the editing terminal apparatus 30, for example. The above-mentioned conversion table may be one conversion table for example corresponding to the metadata notation format compatible with the editing terminal apparatus 30 in accordance with the contents of the other party metadata format identification processing and conversion table selection processing to be executed by the imaging apparatus 40 or a plurality of conversion tables corresponding to various types of notation formats, for example.

The disk unit 316 outputs the metadata and conversion table read as above to the metadata input/output processing block 330.

If the metadata notation formats compatible with the imaging apparatus 40 and the editing terminal apparatus 30 are substantially the same, the recording medium provided from the imaging apparatus 40 may not store the conversion table related with the metadata, for example. In this case, the disk unit 316 may also read only the metadata from that recording medium, for example. In this case, because the notation format of that metadata is compatible with the editing terminal apparatus 30, the metadata notation format conversion processing to be described later need not be executed. Therefore, the read metadata is directly outputted to the metadata application processing block 480 for processing.

The metadata input/output processing block 330 is a feature block associated with the third embodiment of the invention and has a capability of converting external metadata into internal metadata and outputting the resultant internal metadata to the metadata application processing block 380, for example. The metadata input/output processing block 330 has a conversion table selection block 334 and a metadata notation format conversion block 336, for example.

The conversion table selection block 334 has a capability of selecting one conversion table corresponding to the notation format compatible with the metadata application processing block 380 of the editing terminal apparatus 30 from among one or more conversion tables read by the disk unit 316, for example. The contents of the selection processing by the conversion table selection block 334 depend on whether a suitable conversion table has already been selected or not by the above-mentioned other party metadata format identification processing and conversion table selection processing executed by the imaging apparatus 40, for example.

Namely, if the imaging apparatus 40 identifies a metadata notation format compatible with the editing terminal apparatus 30 in advance, only one conversion table for example corresponding to the identified notation format is selected, and the selected conversion table is provided via a recording medium, for example, then the conversion table selection block 334 selects this only one conversion table provided. It should be noted that, in this case, the conversion table selection block 334 may not always be arranged; instead, the selected conversion table may be directly inputted in the metadata notation format conversion block 336.

On the other hand, if the imaging apparatus 40 selects a plurality of conversion tables for example corresponding to unconverted metadata without identifying a metadata notation format compatible with the editing terminal apparatus 30 in advance and provides the selected conversion tables, then the conversion table selection block 334 selects one conversion table corresponding to the notation format compatible with the metadata application processing block 380 from among the plurality of provided conversion tables.

The metadata notation format conversion block 336 is configured as a conversion engine such as the XSLT engine for example and has a capability of converting the notation format of the metadata read from the above-mentioned recording medium into the notation format of internal metadata on the basis of one conversion table for example selected by the conversion table selection block 334, for example. Consequently, the metadata application processing block 380 is capable of recognize and process the converted metadata.

Figure 19:
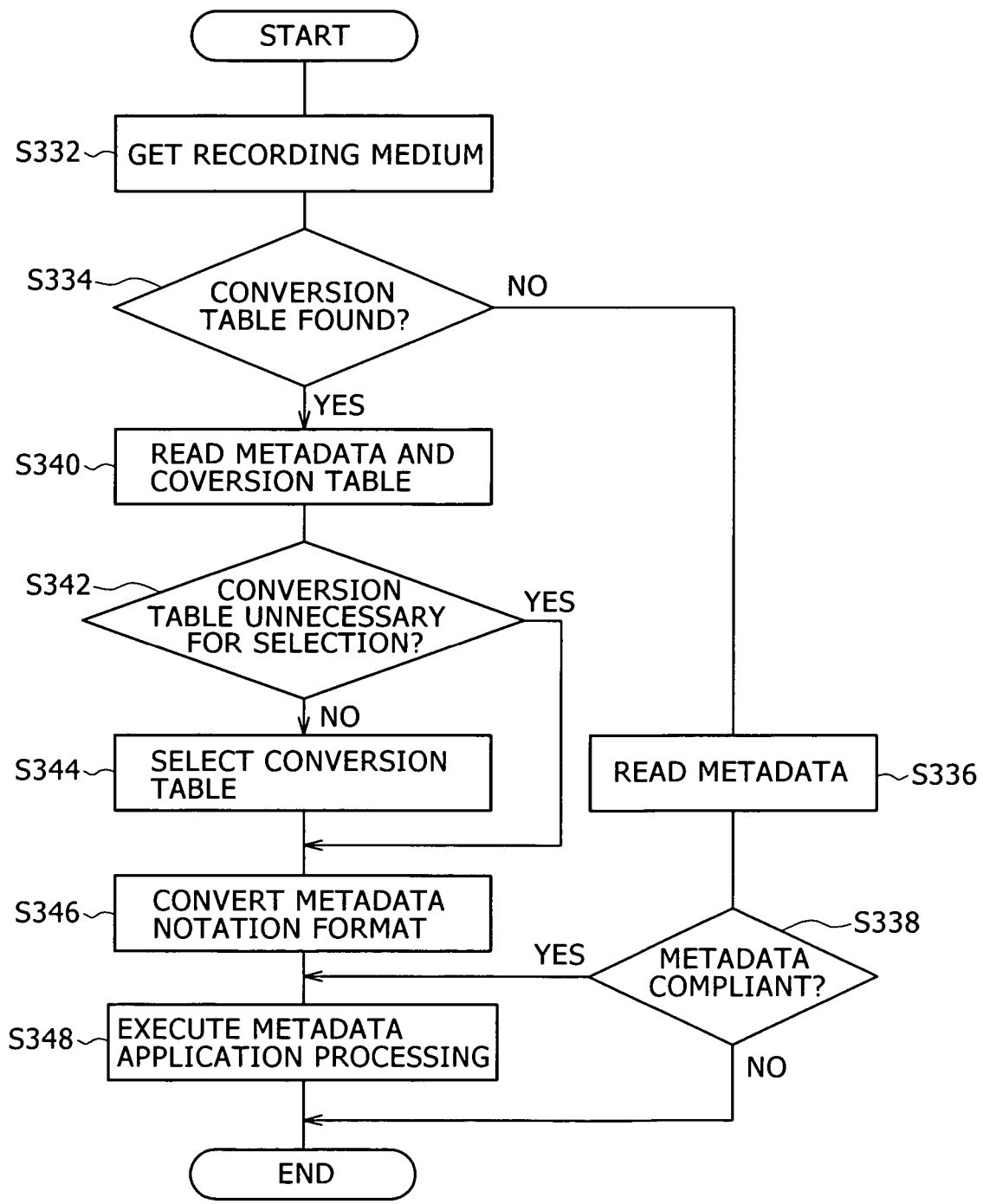
FIG. 19 is a flowchart indicative of a processing method for the editing terminal apparatus practiced as the third embodiment.

The following describes a processing method associated with metadata in the editing terminal apparatus 30 associated with the third embodiment of the invention with reference to FIG. 19. FIG. 19 is a flowchart indicative of the processing method of the editing terminal apparatus 30 associated with the third embodiment.

As shown in FIG. 19, first, in step S332, the editing terminal apparatus 30 gets a recording medium (step S332). The editing terminal apparatus 30 gets a recording medium such as the optical disk 3 with video data and so on recorded by the imaging apparatus 40.

Next, in step S334, it is determined whether a conversion table is recorded to that recording medium (step S334). The metadata input/output processing block 330 determines by use of the recording unit 318 for example whether there is any conversion table such as an XSLT document in the above-mentioned recording medium. If the imaging apparatus 40 is adapted to record a conversion table at the root position of the recording medium for example, the metadata input/output processing block 330 can easily determine whether there is any conversion table or not.

As a result, if a conversion table is found recorded to the recording medium, then the procedure goes to step S340. If no conversion table is found recorded to the recording medium, then the procedure goes to step S336.

In step S336, metadata is read from the recording medium (step S336). The recording unit 318 reads metadata from the recording medium for example and outputs the read metadata to the metadata input/output processing block 330.

In step S338, it is determined whether the metadata read above has a notation format compatible with the editing terminal apparatus 30 (step S338). The metadata input/output processing block 330 determines whether the notation format of the metadata read in step S336 is compatible with the metadata application processing block 380. For example, if the imaging apparatus 40 can identify the above-mentioned other party metadata format and the identified other party metadata format is found substantially the same as the internal metadata notation format in the imaging apparatus 40, then the imaging apparatus 40 provides only the metadata to the editing terminal apparatus 30 without providing a conversion table. In this case, the metadata read in step S336 has a notation format compatible with the editing terminal apparatus 30. In this case, it is determined that the read metadata has a notation format compatible with the metadata application processing block 380 and therefore there is no need for executing conversion processing, upon which the procedure goes to step S348. On the other hand, if the metadata read above has a notation format incompatible with the metadata application processing block 380, then no conversion table is attached. Therefore since the metadata application processing block 380 is incapable of recognizing and processing that metadata, all steps are ended.

On the other hand, in step S340, metadata and a conversion table are read from the recording medium (step S340; metadata reading process). If a conversion table is found recorded to the recording medium in step S334, then the recording unit 318 reads metadata and one or more conversion table corresponding to the metadata from the recording medium and outputs the metadata and one or more conversion tables corresponding to the metadata to the metadata input/output processing block 330.

In step S342, it is determined whether any of the read conversion tables need not be selected (step S342). The metadata input/output processing block 330 determines whether the conversion table read in step S340 is one or more for example. If a plurality of conversion tables are found read, it is required to select one corresponding to the notation format compatible with the metadata application processing block 380, so that the procedure goes to step S344. On the other hand, if only one conversion table has been read, it indicates that one conversion table corresponding to the internal metadata notation format in the editing terminal apparatus 30 has selected by the imaging apparatus 40 in advance, for example. In this case, no conversion table needs to be selected, so that the procedure goes to step S346.

Then, in step S344, the conversion table corresponding to the internal metadata is selected (step S344; conversion table selection process). The conversion table selection block 334 selects one conversion table for example corresponding to the notation format compatible with the metadata application processing block 380 from among one or more conversion tables read in step S340.

Next, in step S346, on the basis of the above-mentioned read or selected conversion table, the notation format of the metadata is converted (step S346; metadata notation format conversion process). The metadata notation format conversion block 336 converts the notation format of the metadata read in step S340 into the notation format compatible with the metadata application processing block 380 on the basis of conversion tables selected in step S344 or only one conversion table read in step S340. Consequently, the editing terminal apparatus 30 becomes able to convert the notation format of the metadata acquired via a recording medium into the notation format recognizable by itself.

Further, in step S348, various metadata application processing operations are executed (step S348; processing control process). The metadata application processing block 380 controls various processing operations in the editing terminal apparatus 30 as described above on the basis of the metadata made recognizable by the notation format conversion, for example. Also, the metadata application processing block 380 may directly recognize and process the external metadata having the notation format found substantially the same as that of the internal metadata in the step S338, for example.

Thus, the editing terminal apparatus 30 first checks to see if there is any conversion table and, if any conversion table is found, converts the notation format of the metadata read from a recording medium into a compatible notation format in accordance with the conversion rules specified by that conversion table. Consequently, the editing terminal apparatus 30 becomes able to equally handle recording media recorded with various types of external metadata.

As described above, in the third embodiment of the invention, the imaging apparatus 40 is capable of recording conversion tables corresponding to the metadata generated and edited by itself to a recording medium along with that metadata. Consequently, having acquired that recording medium, the editing terminal apparatus 30 is capable of easily converting the notation format of metadata read from the recording medium into a notation format recognizable or processable by itself by use of conversion tables read from the recording medium.

Further, recording various types of conversion tables to a recording medium along with the metadata by the imaging apparatus 40 makes this recording medium available to a plurality of editing terminal apparatuses 30 having different recognizable metadata formats. Namely, a given editing terminal apparatus 30 that has acquired this recording medium is capable of selecting a conversion table for converting the notation format of the generated metadata into the notation format compatible with the editing terminal apparatus 30 from among a plurality of recorded conversion tables, thereby suitably executing conversion processing. Thus, by recording plural types of conversion tables to a recording medium in advance allows this one recording medium to function as a metadata transmission medium corresponding to a plurality of editing terminal apparatuses 30 having recognizable different metadata notation formats, for example.

Also, because video data, metadata, and conversion tables are recorded to a recording medium in a related manner, the editing terminal apparatus 30 is capable of easily understanding the correlation between the acquired metadata, conversion tables, and video data. Consequently, the editing terminal apparatus 30 is capable of suitably executing the processing associated with that video data on the basis of the converted metadata.

The metadata generation block 422, the metadata input/output processing blocks 330 and 430, and metadata application processing blocks 380 and 480 in the first through third embodiments may be configured each as a dedicated unit (or hardware device) if the above-mentioned processing functions can be realized or by installing an application program for executing the above-mentioned processing on the terminal apparatuses such as the imaging apparatus 40 and the editing terminal apparatus 30, for example. Further, in the later software approach, the above-mentioned application program may be provided to each of the above-mentioned terminal apparatuses as recorded to a recording medium such as CD-ROM or as externally downloaded via the communication blocks 312 and 412. Alternatively, the above-mentioned application program may be stored in the memory blocks 304 and 404 or the recording unit 318 in the above-mentioned terminal apparatuses, or peripheral devices connected to the external interfaces 314 and 414 of these terminal apparatuses.

As described above, the terminal apparatuses such as the imaging apparatus 40 and the editing terminal apparatus 30 is capable of flexibly handle the input/output of XML-based metadata in accordance with a given notation format, for example. Therefore, if metadata notation formats compatible with terminal apparatuses are different within the video program production support system 1, the terminal apparatuses are capable of smoothly transfer metadata with each other. Consequently, metadata can be shared among a plurality of terminal apparatuses for effective use, thereby enhancing the efficiency of video program production and the quality of video works.

Having described preferred embodiments of the present invention with reference to accompanying drawings, it is to be understood that the invention is not limited to the specific embodiments thereof. It will be obvious to those skilled in the art that many modifications and variations of the present invention are possible in the light of the above teachings. It is therefore to be understood that within the scope of the appended claims in the invention may be practiced otherwise than as specifically described.

For example, the above-mentioned planning terminal apparatus 10, imaging apparatus 40, field PC 50, and editing terminal apparatus 30 may not always be configured by one unit; each of these terminal apparatuses may also be practiced in a plurality of units. For example, video data taken by a plurality of imaging apparatuses 40 may be provided to the editing terminal apparatus 30 via the optical disk 3 or the network 5 for example.

By arranging a center server (not shown) between the above-mentioned planning terminal apparatus 10, material gathering terminal apparatus 20, and editing terminal apparatus 30, the video program production support system 1 may also be configured as a client/server network system with the planning terminal apparatus 10, the material gathering terminal apparatus 20, and the editing terminal apparatus 30 operating as clients.

For example, in the above-mentioned first embodiment of the invention, metadata is directly transmitted and received between the planning terminal apparatus 10, the material gathering terminal apparatus 20, and the editing terminal apparatus 30 via the network 5 for example. However, the present invention is not restricted to this configuration. For example, by arranging a center server (not shown) connected to the network 5, a database for collectively managing metadata and video data may be configured. Consequently, each terminal apparatus is capable of accessing the center server via the network 5, thereby getting and updating metadata and video data.

In the above-mentioned first embodiment of the invention, metadata is transferred between the planning terminal apparatus 10, the material gathering terminal apparatus 20, and the editing terminal apparatus 30 via the network 5 for example. However, the present invention is not restricted to this configuration. For example, metadata may be transferred between the planning terminal apparatus 10, the material gathering terminal apparatus 20, and the editing terminal apparatus 30 via various kinds of recording media for example. This novel configuration eliminates the necessity for arranging the facilities for communication via the network 5, thereby allowing low-cost and easy construction of the video program production support system 1.

In the above-mentioned first through third embodiments of the invention, the material gathering terminal apparatus 20 is made up of two hardware units, namely the imaging apparatus 40 and the field PC 50. However, the present invention is not restricted to this configuration. For example, the material gathering terminal apparatus 20 may be configured by one hardware unit if this hardware unit has both the functions of the imaging apparatus 40 and the field PC 50. The material gathering terminal apparatus 20 based on one hardware unit may be realized by connecting input means such as a keyboard to the imaging apparatus 40 and allowing the material gathering department personnel to enter the above-mentioned shooting situation information and take shooting situation information through the input means.

In the above-mentioned first through third embodiments of the invention, the video program production support system 1 has only the planning terminal apparatuses 10, 20, and 30 corresponding to the planning and organization department, the material gathering department, and editing department. However, the present invention is not restricted to this configuration. In addition to these departments, there are a variety of departments engaged in actual video program producing activities, such as clerical department, equipment department, information department, script department, CG/SI department, cast department, source material department, data storage department, for example. Therefore, the video program production support system 1 may also have one or more terminal apparatuses (or video signal processing apparatuses) corresponding to each of these departments, thereby sharing the above-mentioned metadata among many terminal apparatuses.

In the above-mentioned first through third embodiments of the invention, XML is used for a metadata description language. However, the present invention is not restricted to this configuration. For example, any of other languages such as markup languages including HTML (Hyper Text Markup Language), SGML (Standard Generalized Markup Language) and other various languages than XML. It is also practicable to make conversion in metadata notation format between different markup languages, XML and HTML for example.

In the above-mentioned first through third embodiments of the invention, an example of the imaging apparatus 40 is used as one embodiment of the video signal recording apparatus and an example of the editing terminal apparatus 30 is used as another embodiment of the video signal recording apparatus. However, the present invention is not restricted to this configuration. For example, the video signal recording apparatus may be configured by an apparatus other than the imaging apparatus 40 if that apparatus is capable of recording video signals to a recording medium. Also, the video signal reproduction apparatus may be configured by an apparatus other than the editing terminal apparatus 30 if that apparatus is capable of reproducing video signals.

In the above-mentioned first through third embodiments of the invention, the video signal processing apparatuses such as the video signal recording apparatus and the video signal reproduction apparatus are configured as components of one video program production support system 1. However, the present invention is not restricted to this configuration. For example, the video signal processing apparatuses such as the video signal recording apparatus and the video signal reproduction apparatus may be used not only in combination in a predetermined system but also in a standalone manner.

In the above-mentioned third embodiment of the invention, the imaging apparatus 40 provides metadata and/or conversion tables to the editing terminal apparatus 30 along with video data via a recording medium such as the optical disk 3. However, the present invention is not restricted to this configuration. For example, the imaging apparatus 40 may provide video data and metadata and/or conversion table separately to the editing terminal apparatus 30. Namely, the imaging apparatus 40 may provide metadata and/or conversion tables to the editing terminal apparatus 30 via any of various recording media such as memory card, memory stick, and magnetic disk for example other than the optical disk 3 in which video data is recorded. Also, the imaging apparatus 40 may provide metadata and/or conversion tables to the editing terminal apparatus 30 by the transmission via the network 5.

INDUSTRIAL APPLICABILITY

As described and according to the invention, the video signal processing apparatus is capable of flexibly coping with the input/output of metadata having various notation formats. Consequently, metadata can be shared among a plurality of video signal processing apparatuses for effective use, thereby enhancing the efficiency of video work production as well as the quality of video works.

The invention claimed is:

1. A video signal processing apparatus for processing a video signal, comprising:
   a metadata notation format identification block for identifying a notation format of metadata written in a predetermined language;
   a conversion table selection block for selecting a conversion table corresponding to said identified notation format of said metadata from among one or more conversion tables prepared in advance;
   a metadata notation format conversion block for converting said notation format of said metadata into a notation format compatible with said video signal processing apparatus on the basis of said selected conversion table; and
   a processing control block for controlling processing associated with said video signal on the basis of said metadata whose notation format has been converted,
   wherein the conversion table includes predetermined conversion information to convert a tag in the notation format in the predetermined language into a tag in the notation format compatible with the video signal processing apparatus, and
   wherein when the conversion table has no corresponding definition for the tag in the notation format in the predeterminded language, a conversion of the tag in the notation format in the predetermined language generates a converted tag that includes a prefix representing the predetermined language and a name space of the tag.

2. The video signal processing apparatus according to claim 1, wherein said predetermined language is a markup language.

3. The video signal processing apparatus according to claim 1, wherein said video signal processing apparatus is a video signal recording apparatus for recording said video signal to a recording medium.

4. The video signal processing apparatus according to claim 1, wherein said video signal processing apparatus is a video signal reproduction apparatus for reproducing said video signal.

5. The video signal processing apparatus according to claim 2, wherein said metadata notation formation identification block detects a tag from said metadata written in said markup language, thereby identifying said notation format of said metadata.

6. The video signal processing apparatus according to claim 2, wherein said markup language is XML.

7. The video signal processing apparatus according to claim 6, wherein said metadata notation format conversion block is an XSLT engine.

8. A non-transitory computer-readable recording medium storing a program for making a computer function as a video signal processing apparatus comprising:
   a metadata notation format identification block for identifying a notation format of metadata written in a predetermined language;
   a conversion table selection block for selecting a conversion table corresponding to said identified notation format of said metadata from among one or more conversion tables prepared in advance;
   a metadata notation format conversion block for converting said notation format of said metadata into a notation format compatible with said video signal processing apparatus on the basis of said selected conversion table; and
   a processing control block for controlling processing associated with said video signal on the basis of said metadata whose notation format has been converted,
   wherein the conversion table includes predetermined conversion information to convert a tag in the notation format in the predetermined language into a tag in the notation format compatible with the video signal processing apparatus, and
   wherein when the conversion table has no corresponding definition for the tag in the notation format in the predeterminded language, a conversion of the tag in the notation format in the predetermined language generates a converted tag that includes a prefix representing the predetermined language and a name space of the tag.

9. A processing method for a video signal processing apparatus for processing a video signal, comprising the steps of:
   identifying a notation format of metadata written in a predetermined language;
   selecting a conversion table corresponding to said identified notation format of said metadata from among one or more conversion tables prepared in advance;
   converting said notation format of said metadata into a notation format compatible with said video signal processing apparatus on the basis of said selected conversion table; and
   controlling processing associated with said video signal on the basis of said metadata whose notation format has been converted,
   wherein the conversion table includes predetermined conversion information to convert a tag in the notation format in the predetermined language into a tag in the notation format compatible with the video signal processing apparatus, and
   wherein when the conversion table has no corresponding definition for the tag in the notation format in the predetermined language, a conversion of the tag in the notation format in the predetermined language generates a converted tag that includes a prefix representing the predetermined language and a name space of the tag.

10. A video signal recording apparatus for recording a video signal to a recording medium, comprising:
    a metadata generating block for generating metadata associated with said video signal by writing said metadata in a predetermined language;

a metadata notation format conversion block for converting at least a notation format of said generated metadata into a notation format compatible with a video signal reproduction apparatus for reproducing said video signal recorded to said recording medium, on the basis of one or more conversion tables prepared in advance; and a video signal recording block for recording said metadata whose notation format has been converted and said video signal in a related manner so as to allow said video signal reproduction apparatus to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

11. The video signal recording apparatus according to claim 10 wherein said predetermined language is a markup language.

12. The video signal recording apparatus according to claim 10, wherein said recording medium is an optical disk.

13. The video signal recording apparatus according to claim 10, further comprising: a conversion table selection block for selecting a conversion table corresponding to said notation format of said metadata at least compatible with said video signal reproduction processing, from among one or more conversion tables, wherein said metadata notation format conversion block converts at least said notation format of said generated metadata into a notation format compatible with said video signal reproduction apparatus on the basis of a conversion table selected by said conversion table selection block.

14. The video signal recording apparatus according to claim 11, wherein said markup language is XML.

15. The video signal recording apparatus according to claim 14, wherein said metadata notation format conversion block is an XSLT engine.

16. A non-transitory computer-readable recording medium recording a program for making a computer function as a video signal recording apparatus for recording a video signal to a recording medium, comprising:

a metadata generating block for generating metadata associated with said video signal by writing said metadata in a predetermined language;

a metadata notation format conversion block for converting at least a notation format of said generated metadata into a notation format compatible with a video signal reproduction apparatus for reproducing said video signal recorded to said recording medium, on the basis of one or more conversion tables prepared in advance; and a video signal recording block for recording said metadata whose notation format has been converted and said video signal in a related manner so as to allow said video signal reproduction apparatus to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

17. A processing method for a video signal recording apparatus for recording a video signal to a recording medium, comprising the steps of:

generating metadata associated with said video signal by writing said metadata in a predetermined language;

converting at least a notation format of said generated metadata into a notation format compatible with a video signal reproduction apparatus for reproducing said video signal recorded to said recording medium, on the basis of one or more conversion tables prepared in advance; and recording said metadata whose notation format has been converted and said video signal in a related manner so as to allow said video signal reproduction apparatus to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

18. A video signal recording apparatus for recording a video signal to a recording medium, comprising:

a metadata generating block for generating metadata associated with said video signal by writing said metadata in a predetermined language;

a conversion table selection block for selecting at least one conversion table from among one or more conversion tables prepared in advance; and a video signal recording block for recording at least said generated metadata, said selected conversion table, and said video signal in a related manner to said recording medium so as to allow a video signal reproduction apparatus for reproducing said video signal recorded to said recording medium to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

19. A non-transitory computer-readable recording medium recording a program for making a computer function as a video signal recording apparatus for recording a video signal to a recording medium, comprising:

a metadata generating block for generating metadata associated with said video signal by writing said metadata in a predetermined language;

a conversion table selection block for selecting at least one conversion table from among one or more conversion tables prepared in advance; and a video signal recording block for recording at least said generated metadata, said selected conversion table, and said video signal in a related manner so as to allow a video signal reproduction apparatus for reproducing said video signal recorded to said recording medium to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

20. A processing method for a video signal recording apparatus for recording a video signal to a recording medium, comprising the steps of:

generating metadata associated with said video signal by writing said metadata in a predetermined language;

selecting at least one conversion table from among one or more conversion tables prepared in advance; and recording at least said generated metadata, said selected conversion table, and said video signal in a related manner so as to allow a video signal reproduction apparatus for reproducing said video signal recorded to said recording medium to control processing associated with said video signal on the basis of said metadata, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

21. A video signal reproduction apparatus for reproducing a video signal recorded to a recording medium, comprising:

a metadata reading block for reading metadata written in a predetermined language and at least one conversion table corresponding to a notation format of said metadata from said recording medium in which said video signal is recorded;

a metadata notation format conversion block for converting said notation format of said metadata read from said recording medium into a notation format compatible with said video signal reproduction apparatus on the basis of said at least one read conversion table; and a processing control block for controlling processing associated with said video signal on the basis of said metadata whose notation format has been converted, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

22. A non-transitory computer-readable recording medium recording a program for making a computer function as a video signal reproduction apparatus for reproducing a video signal recorded to a recording medium, comprising:

a metadata reading block for reading metadata written in a predetermined language and at least one conversion table corresponding to a notation format of said metadata from said recording medium in which said video signal is recorded;

a metadata notation format conversion block for converting said notation format of said metadata read from said recording medium into a notation format compatible with said video signal reproduction apparatus on the basis of said at least one read conversion table; and a processing control block for controlling processing associated with said video signal on the basis of said metadata whose notation format has been converted, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

23. A processing method for a video signal reproduction apparatus for reproducing a video signal recorded to a recording medium, comprising the steps of:

reading metadata written in a predetermined language and at least one conversion table corresponding to a notation format of said metadata from said recording medium in which said video signal is recorded;

converting said notation format of said metadata read from said recording medium into a notation format compatible with said video signal reproduction apparatus on the basis of said at least one read conversion table; and controlling processing associated with said video signal on the basis of said metadata whose notation format has been converted, wherein the conversion table includes predetermined conversion information to convert a tag in the notation format in the predetermined language into a tag in the notation format compatible with the video signal processing apparatus, and wherein when the conversion table has no corresponding definition for the tag in the notation format in the predetermined language, a conversion of the tag in the notation format in the predetermined language generates a converted tag that includes a prefix representing the predetermined language and a name space of the tag.

* * * * *